United States Patent
Shorten

(10) Patent No.: US 12,489,623 B2
(45) Date of Patent: *Dec. 2, 2025

(54) SYSTEMS AND COMPUTER-IMPLEMENTED METHODS FOR GENERATING PSEUDO RANDOM NUMBERS

(71) Applicant: Mesinja Pty Ltd, Camberwell (AU)

(72) Inventor: Robert Bede Shorten, Camberwell (AU)

(73) Assignee: MESINJA PTY LTD, Camberwell (AU)

( * ) Notice: Subject to any disclaimer, the term of this patent is extended or adjusted under 35 U.S.C. 154(b) by 262 days.

This patent is subject to a terminal disclaimer.

(21) Appl. No.: 17/791,789

(22) PCT Filed: Jan. 6, 2021

(86) PCT No.: PCT/AU2021/050008
§ 371 (c)(1),
(2) Date: Jul. 8, 2022

(87) PCT Pub. No.: WO2021/138717
PCT Pub. Date: Jul. 15, 2021

(65) Prior Publication Data
US 2023/0047518 A1    Feb. 16, 2023

(30) Foreign Application Priority Data

Jan. 10, 2020  (AU) ................................ 2020900064
Apr. 30, 2020  (AU) ................................ 2020202883

(51) Int. Cl.
*G06F 7/58*     (2006.01)
*G06F 17/11*    (2006.01)
(Continued)

(52) U.S. Cl.
CPC ............ *H04L 9/0894* (2013.01); *G06F 7/582* (2013.01); *G06F 7/586* (2013.01); *G06F 17/11* (2013.01); *H04L 9/0662* (2013.01)

(58) Field of Classification Search
CPC ..... H04L 9/0894; H04L 9/0662; G06F 7/582; G06F 7/586; G06F 17/11; G06F 7/552; G06F 17/17; A63F 13/45; G07F 17/326
See application file for complete search history.

(56) References Cited

U.S. PATENT DOCUMENTS 6,757,700 B1 *  6/2004  Druck ................. G06F 7/49947
                                                      708/204
11,886,980 B2 *  1/2024  Dally ..................... G06N 3/063
(Continued)

FOREIGN PATENT DOCUMENTS

EP    1 548 987 A2    6/2005
EP    1 804 731 A2    10/2007
(Continued)

OTHER PUBLICATIONS

International Search Report for priority application No. PCT/AU2021/050008 dated Mar. 19, 2021, 6p.
(Continued)

*Primary Examiner* — Farid Homayounmehr
*Assistant Examiner* — Mudasiru K Olaegbe
(74) *Attorney, Agent, or Firm* — Crowell & Moring LLP

(57) ABSTRACT

A methods comprises: receiving, by a pseudo random number generator module, an instruction to generate pseudo random numbers from a security application; determining, by the pseudo random number generator module, at least one algebraic input parameter value for a transcendental equation from a randomness library in memory of the device, wherein the transcendental equation comprises a transcendental function that is capable of generating transcendental
(Continued)

number outputs from algebraic number inputs; calculating, by the pseudo random number generator module, a solution to the transcendental equation based on the at least one algebraic input parameter value; determining, by the pseudo random number generator module, pseudo random number (s) based on the solution; and storing, by the pseudo random number generator module, the pseudo random number(s) in a randomness library for use as seeds for keys by the security application and as subsequent input parameter values for the pseudo random number generator module.

27 Claims, 8 Drawing Sheets

(51) Int. Cl.
*H04L 9/06* (2006.01)
*H04L 9/08* (2006.01)

(56) References Cited

U.S. PATENT DOCUMENTS

| | | |
|---|---|---|
| 2003/0059045 A1 | 3/2003 | Ruehle |
| 2003/0144052 A1 | 7/2003 | Walker et al. |
| 2003/0182246 A1 | 9/2003 | Johnson et al. |
| 2004/0078576 A1 | 4/2004 | Geitinger |
| 2004/0086117 A1* | 5/2004 | Petersen ............... H04L 9/0668 380/44 |
| 2009/0170584 A1 | 7/2009 | Tan et al. |
| 2009/0313050 A1 | 12/2009 | Payne et al. |
| 2013/0142323 A1* | 6/2013 | Chiarella ............... G06F 7/58 380/28 |
| 2013/0315388 A1 | 11/2013 | Chiarella |
| 2014/0016778 A1 | 1/2014 | Goettfert et al. |
| 2015/0055778 A1 | 2/2015 | Cox et al. |
| 2016/0380760 A1 | 12/2016 | Campos Canton et al. |
| 2017/0034167 A1 | 2/2017 | Figueira |
| 2017/0264598 A1 | 9/2017 | Cordes |
| 2018/0300108 A1* | 10/2018 | Goldman ............... H04L 67/10 |
| 2019/0238329 A1* | 8/2019 | Leara ............... G06F 7/58 |
| 2020/0158813 A1* | 5/2020 | Mutz ............... H04W 12/12 |
| 2021/0138232 A1* | 5/2021 | Paz ............... A61N 1/36021 |

FOREIGN PATENT DOCUMENTS

| | | |
|---|---|---|
| EP | 1 840 731 A2 | 10/2007 |
| EP | 3 373 505 A1 | 9/2018 |
| WO | WO 2001/43067 A2 | 6/2001 |
| WO | WO 2006/033898 A2 | 3/2006 |
| WO | WO 2014/027285 A1 | 2/2014 |
| WO | WO 2016/102164 A1 | 6/2016 |

OTHER PUBLICATIONS

Written Opinion of the International Searching Authority for priority application No. PCT/AU2021/050008 dated Mar. 19, 2021, 6p.
International Search Report for application No. PCT/AU2021/050007 dated Mar. 19, 2021, 6p.
Written Opinion of the International Searching Authority for application No. PCT/AU2021/050007 dated Mar. 19, 2021, 6p.
Written Opinion of the International Preliminary Examining Authority for application No. PCT/AU2021/050007 dated Jun. 11, 2021, 7p.
Written Opinion of the International Preliminary Examining Authority for application No. PCT/AU2021/050007 dated Jul. 22, 2021, 8p.
Written Opinion of the International Preliminary Examining Authority for application No. PCT/AU2021/050007 dated Oct. 5, 2021, 8p.
International Search Report for application No. PCT/AU2021/050009 dated Mar. 19, 2021, 6p.
Written Opinion of the International Searching Authority for application No. PCT/AU2021/050009 dated Mar. 19, 2021, 5p.
International Search Report for application No. PCT/AU2021/050010 dated Mar. 22, 2021 , 5p.
Written Opinion of the International Searching Authority for application No. PCT/AU2021/050010 dated Mar. 22, 2021, 6p.
Examination Report No. 1 for Australian application No. 2020202883 dated Jun. 4, 2020, 7p.
Examination Report No. 2 for Australian application No. 2020202883 dated Sep. 17, 2020, 4p.
Examination Report No. 1 for Australian application No. 2021200062 dated Feb. 24, 2021, 8p.
Examination Report No. 1 for Australian application No. 2021200063 dated Feb. 24, 2021, 4p.
Boriga, R. et al., "A Novel Pseudo-random Bit Generator Based on Some Transcendental Chaotic Systems", *Ovidius University Annals, Economic Sciences Series, Ovidius University of Constantza*, Faculty of Economic Sciences, pp. 208-212, vol. XI, Issue 1, 2011, Romania.
Feigenbaum, J. J. et al,. "Quantitative universality for a class of nonlinear transformations", *Journal of Statistical Physics*, Jul. 1978, vol. 19, No. 1, pp. 25-52.
Tu, L. et al., "A Novel Gray Image Encryption Algorithm Based on Modified Transcendental Equation", *Journal of Software (Academy Publishing)*, pp. 2336-2343, vol. 8, No. 9, Sep. 2013, United Kingdom.
"Pseudorandom number generator", Mar. 1, 2016, found on the internet @ https://web.archive.org/web/20160301034145/https://en.wikipedia.org/wiki/Pseudorandom_number_generator, as per Wayback Machine, 8p.
"Simple random sample", Oct. 24, 2016, found on the internet @ https://web.archive.org/web/20161024131124/https://en.wikipedia.org/wiki/Simple_random_sample, as per Wayback Machine, 4p.
"Recurrence relation", Mar. 5, 2016, found on the internet @ https://web.archive.org/web/20110305192204/https://en.wikipedia.org/wiki/Recurrence_relation, as per Wayback Machine, 11p.

* cited by examiner

SYSTEMS AND COMPUTER-IMPLEMENTED METHODS FOR GENERATING PSEUDO RANDOM NUMBERS

RELATED APPLICATION

This application is a national phase application of International Application No. PCT/AU2021/050008, filed on Jan. 6, 2021, which claim priority to Australian Patent Application No. 2020900064, filed on Jan. 10, 2020 and Australian Patent Application No. 2020202883, filed on Apr. 30, 2020. The entirety of the above applications is hereby incorporated by reference.

TECHNICAL FIELD

Described embodiments relate to systems and computer-implemented methods for generating pseudo random numbers based on solutions to transcendental equations. Some embodiments relate to generating pseudo random numbers to address the issue of insufficient entropy (also referred to as entropy starvation) on low-power, constrained Internet of Things ("IoT") devices or virtual machines, for example. Some embodiments relate to generating pseudo random numbers for use in security applications such as encryption and decryption processes.

BACKGROUND

Random number generators fall under two broad headings: Pseudo Random Number Generators ("PRNGs"); and True (or Hardware) Random Number Generators ("TRNGs").

PRNGs generate a sequence of numbers using an algorithm—in most cases they are based on complicated iterated calculations to generate an output that appears "random" due to the complexity of the calculations. The starting point for the PRNG is called the "seed"—the internal structure of the PRNG and the choice of the "seed" can have a significant influence on the statistical properties of the numbers generated by the existing PRNG algorithms. When a PRNG needs a "random" seed, often sources of entropy from the system or external hardware are used to seed the PRNG.

There are many different PRNGs that use iterated algebraic calculations to generate outputs that appear to be "random". An example of a group of PRNGs that rely on a simple iterated calculation are the Linear Congruential Generators ("LCGs")—the fundamental computation in an LCG is as follows:

$$X_{n+1} = (aX_n + b) \bmod m$$

The output sequence of numbers, represented by $X_n$, for n=0, 1, 2, 3, . . . , is based on an internal hidden state from which the $X_n$'s are derived according to the formula shown above. The seed is the first number, $X_0$, in the sequence.

Although there are many distinct LCG algorithms, their outputs tend to exhibit poor statistical behaviour. To help deal with the relatively poor statistical behaviour of individual LCG algorithms, PRNGs based on combinations of different LCGs ("combined LCGs") have been developed.

The total number of unique elements in the sequence generated is always finite—as such, the PRNG will repeat the sequence of numbers it generates at some stage. PRNGs with a large sequence before the PRNG repeats itself have what is known as a large "state". Many of the PRNGs developed in the last thirty to forty years have been designed with a large state coupled with statistical properties that make the output appear to be "random".

Another example of a different class of PRNGs is chaotic PRNGs which generate random numbers through the use of an iterated calculation that exhibits the hallmarks of mathematical chaos, i.e., where the stream of numbers produced by the PRNG exhibit the following broad properties:
 Sensitive dependence on the initial starting point;
 Rapid onset of apparently random unstable behaviour where one or more parameters in the iterated calculation reach certain "critical" values; and
 Where the instabilities (in terms of the numbers generated) display apparent aperiodic and unpredictable behaviour (or nearly so) for all practical purposes.

There also exist PRNGs that are mixed combinations of two or more unrelated PRNGs where the outputs are combined in an effort to improve the statistical performance of the aggregated output.

Due to computational needs, memory requirements, security needs, and the desired statistical quality of the random numbers generated, there are many different PRNG algorithms. No one algorithm tends to be suitable for all situations; for example, some PRNGs which are suitable for computer simulations may not be suitable for cryptographic applications.

As noted above, no algorithm on a computer or device can ever be a true random number generator since the limited capacity of the computer or device to carry digits means it is inevitable that the algorithm will eventually return to its starting point and repeat itself.

To deal with this, TRNGs have been developed that utilise an underlying physical or quantum process as a source of randomness. Every physical or quantum source is generally checked to see whether or not there is some bias or other regularity that might undermine its usefulness as a randomness source. This is usually addressed by further software based processing to reduce or eliminate these biases and/or other regularities. Furthermore, there are very many settings where the availability of a suitably reliable source of entropy may be lacking or only operate intermittently and, as such, impose a performance constraint that can limit the utility of the external randomness source.

A significant challenge impeding the development of the IoT is the issue of insufficient entropy (also referred to as entropy starvation) on low-power, constrained IoT devices (i.e., an IoT device with little or no entropy available from which suitably random seeds can be generated for its security software to function properly, especially at device start-up, where the IoT device has limited processing power and minimal input/output operations).

The Open Web Application Security Project® (OWASP) is a non-profit foundation that works to improve the security of software. In 2018 the OWASP IoT Security Team released document that set out its assessment of the highest priority security issues for manufacturers, enterprises, and consumers related to the Internet of Things. Briefly summarised, the list comprised: 1. Weak, guessable, or hardcoded passwords; 2. Insecure network services; 3. Insecure ecosystem interfaces; 4. Lack of secure update mechanism; 5. Use of insecure or outdated components; 6. Insufficient privacy protection; 7. Insecure data transfer and storage; 8. Lack of device management; 9. Insecure default settings; and 10. Lack of physical hardening. Of these, items 1-4, 6 and 7 are potentially affected by insufficient entropy occurring on low-power, constrained IoT devices.

Most IoT devices are typically isolated from larger computer systems—when they need to communicate with other devices this is usually via a wireless network connection. IoT device network connections need to be secure; otherwise the device can become a potential conduit for unauthorised access to the network. Many IoT devices are able to harvest sufficient entropy from sources of physical noise generated by the device itself. This physical noise, after some software processing, is used to seed the PRNG within the device's internal security software that secures the device's network connections.

The advantage of using on-device physical noise (e.g., thermal noise from the device components) arises from its inherent unpredictability. However, this raw unpredictable noise is often biased (i.e., the proportion of 1's and 0's is not 50%/50%) and often exhibits correlations between the bits. As such, software is required to de-bias and condition, that is improve the statistical qualities of the raw entropy output before it can be used—the practical issue is that the quantum of statistically higher quality de-biased and conditioned bit stream is usually only a fraction of the original randomness produced by the noise source and is dependent on the quality of the software used in the de-biasing and conditioning step.

For low-power, constrained IoT devices, however, there is often insufficient on-device entropy (especially at start-up) for the internal security software to function properly (as the seeds generated in these circumstances lack sufficient usable randomness). This creates the potential for the IoT device to be a serious weak spot for the larger network that the device is connected to.

A significant challenge also faces operators of data centres and similar facilities arises where services offered on the cloud are provided by separate instances of Virtual Machines (VMs). In most cases, the various instances of the VMs are isolated by their system organisation/architecture from entropy generated by the underlying hardware or other physical sources. The generic inability to access suitable sources of entropy means that internal security software operating on the VMs cannot function properly which creates potential security vulnerabilities for users of the VM.

There have been a number of studies in the last eight years where private keys from public/private key systems operating on the internet have been reverse engineered successfully (the papers are: (i) N. Heninger, Z. Durumeric, E. Wustrow, and J. A. Halderman, "Mining your Ps and Qs: detection of widespread weak keys in network device," Proceedings of the 21st USENIX Security Symposium, August 2012; (ii) A. K. Lenstra, J. P. Hughes, M. Augier, J. W. Bos, T. Kleinjung, and C. Wachter, "Ron was wrong, Whit is right", 32nd International Cryptology Conference, August 2012; (iii) M. Hastings, J. Fried, and N. Heninger, "Weak keys remain widespread in network devices," Proceedings of the 2016 Internet Measurement Conference (IMC '16), ACM, New York, N.Y., USA, 49-63; and (iv) J. Kilgallin and R. Vasko, "Factoring RSA Keys in the IoT Era", presented at the First IEEE International Conference on Trust, Privacy and Security in Intelligent Systems, and Applications (December 2019), Los Angeles, Calif., USA.).

The root causes of this were identified as: (i) too little entropy being available for key generation leading to repeated keys; or (ii) the use of default keys, both of which reduced the potential number of keys that might be used making them vulnerable to an attack.

Furthermore, in 2016, two researchers at the Computer Security Division, Information Technology Laboratory, National Institute of Standards and Technology (NIST) published an article (see: A. Vassilev and R. Staples, "Entropy as a Service: Unlocking Cryptography's Full Potential," Computer, 2016, Vol. 49, Issue 9, pp. 98-102) addressing entropy insufficiency and the use of entropy-as-a-service as a possible solution. In that paper they investigated the strength of the Linux kernel entropy sources—the analysis simulated the behaviour of a device lacking a hard drive, mouse, key board, etc., with an initially empty entropy pool using a pared-down Linux kernel with different combinations of kernel entropy input devices disabled. They found that: "[d]epending on the combination of entropy sources disabled, the entropy count in the pool took anywhere from 20 to 45 seconds to generate the bare-minimum threshold of 112 bit"; and "[m]ore time was needed to reach the threshold when some contributing sources were turned off, simulating environments with constrained resources."

These findings show that in an entropy constrained environment, a low-power IoT device or a VM may well suffer from insufficient entropy such that its security software does not function properly. This situation may undermine secure internet communications for these devices creating opportunities for hacking and cybercrime where none should exist.

Entropy services and hardware based solutions are impractical in the context of low-power, constrained IoT devices, or VMs. This is because Entropy as a Service ("EaaS") options rely on third party service providers thereby leaving a fundamental element of the security of the device in the hands of a third party and, in any case, are premised on an assumption that the IoT device has active secure access to the internet. Furthermore, hardware entropy sources connected to a low-power, constrained IoT device adds materially to cost and involves additional software (usually some form of PRNG and/or hash function) post-processing overhead to de-bias and condition the output.

On-device sources of entropy are typically not accessible to VMs and/or may be of poor or varying statistical quality. However, where individual hardware entropy sources are available to be connected to each instance of a VM, additional hardware and software post-processing to de-bias and condition the output using a PRNG and/or hash function is needed.

Using an existing PRNG for de-biasing and conditioning is potentially problematic. Many PRNGs are vulnerable to: (i) poorly chosen seeds such that the PRNG enters a small cycle or takes a significant amount of time to generate uncorrelated bits from the starting seed, etc.; (ii) generation of detectable biases and correlations with the bit stream output; and (iii) reverse engineering of their outputs.

The same point can be made in relation to hash functions used to de-bias and condition the raw entropy from a hardware source—most hash functions operate in a similar fashion to block ciphers including many well-known hash functions such as MD4, MD5, SHA-1 and SHA-2.

As testing and analysis of PRNGs and hash functions has advanced over time, many well-known PRNGs and hash functions have been found to be deficient (e.g., RC4, Mersenne Twister, MD4, MD5, etc.). Since analysis of PRNGs and hash functions is an ever developing field, there is no assurance that an attack that is considered difficult today on a given PRNG or hash function won't be feasible at some point in the future.

It is desired to address or ameliorate one or more shortcomings or disadvantages associated with prior methods and systems for random number generation, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a computer implemented method of generating pseudo random numbers, the method comprising: a) determining at least one algebraic input parameter value for a transcendental equation, wherein the transcendental equation comprises a transcendental function that is capable of generating transcendental number outputs from algebraic number inputs; b) calculating a solution to the transcendental equation based on the at least one algebraic input parameter value; and c) generating the pseudo random numbers based on the solution. For example, the pseudo random numbers may be decimal numbers, binary numbers or numbers that are neither decimal numbers nor binary numbers.

Some embodiments relate to a computer implemented method comprising: a) receiving, by a pseudo random number generator module, an instruction to generate pseudo random numbers from a security application; b) determining, by the pseudo random number generator module, at least one algebraic input parameter value for a transcendental equation from a randomness library in memory of the device, wherein the transcendental equation comprises a transcendental function that is capable of generating transcendental number outputs from algebraic number inputs; c) calculating, by the pseudo random number generator module, a solution to the transcendental equation based on the at least one algebraic input parameter value; d) determining, by the pseudo random number generator module, one or more pseudo random numbers based on the solution; e) storing, by the pseudo random number generator module, the one or more pseudo random numbers in a randomness library for use as seeds for keys by the security application and as subsequent input parameter values for the pseudo random number generator module.

In some embodiments, the method comprises deploying in the randomness library, an initial randomness pool of one or more pseudo random numbers or random numbers from a hardware entropy source. The randomness library may comprise a first randomness pool and a second randomness pool distinct from the first randomness pool, and the method may further comprise: determining, by the pseudo random number generator module, the at least one algebraic input parameter value for the transcendental equation from the first randomness pool at initiation of the pseudo random number generator module; determining, by the pseudo random number generator module, a first stream of pseudo random numbers and a second stream of pseudo random numbers from the one or more pseudo random numbers derived from the solution; and wherein storing, by the pseudo random number generator module, the one or more pseudo random numbers in the randomness library comprises storing the first stream of pseudo random numbers in the first randomness pool and the second stream of pseudo random numbers in the second randomness pool.

In some embodiments, the method comprises retrieving, by the security application, a seed value based on a random number selected from the randomness library; and using, by the security application, the seed value as a key for a security process. For example, retrieving, by the security application, the seed value may comprise selecting the random number from the second randomness pool.

In some embodiments, determining, by the pseudo random number generator module, the at least one algebraic input parameter value for the transcendental equation from the randomness library may comprise selecting the at least one algebraic input parameter from the first randomness pool.

In some embodiments, calculating the solution to the transcendental equation may comprise generating a first sequence of pseudo random numbers, wherein the pseudo random number output is selected as a subset of pseudo random numbers in the sequence of pseudo random numbers.

In some embodiments, calculating the solution to the transcendental equation may comprise generating a first sequence of pseudo random numbers and a second sequence of pseudo random numbers, wherein the one or more pseudo random numbers are selected from the first sequence of pseudo random numbers and stored in the randomness library for use as seed values for the security application and the at least one input parameter value for calculating subsequent one or more pseudo random numbers is selected from the second sequence of pseudo random numbers.

Storing, by the pseudo random number generator module, the one or more pseudo random numbers in the randomness library may comprise overwriting respective previously stored one or more pseudo random numbers.

The method may comprise: iteratively performing, by the pseudo random number generator module, steps c) and d) for a predetermined period, whereby the at least one input parameter for each iteration is derived from the one or more pseudo random numbers determined in the previous iteration.

In some embodiments, determining the at least one algebraic input parameter value may comprise: selecting the at least one algebraic input parameter value from a set of algebraic numbers, each of which when provided as an input to the transcendental function cause the transcendental function to output a transcendental number.

The transcendental function may be associated with an exceptional set, and wherein the transcendental function will produce a transcendental number for all algebraic input values that do not belong to the exceptional set, and an algebraic number for all algebraic input parameter values that do belong to the exceptional set. The exceptional set may be (i) a countable finite set of algebraic values or (ii) a countably infinite set of algebraic values which is only a negligible sub-set of the algebraic numbers.

Generating the pseudo random numbers may comprise: converting the solution into a pseudo random number (i.e., a decimal number (for example, between 0 and 1), a binary number or number that is neither a decimal number nor a binary number); and converting the pseudo random number into a binary string of pseudo random numbers. The pseudo random numbers may comprise a binary string of the pseudo random numbers. Generating the binary string may comprise assigning one of a zero or a one to each even digit of the decimal value and assigning the other of a zero or a one to each odd digit of the decimal value. In some embodiments, determining which one of a zero or a one to assign to each even digit and each odd digit of the decimal value by determining whether (i) the decimal value, or, alternatively, (ii) a decimal generated in a prior iteration, is greater than 0.5. The method may comprise converting the decimal value into the binary string of pseudo random numbers comprises replacing each digit of the decimal value with the last bit of the equivalent ASCII character.

In some embodiments, generating the binary string of pseudo random numbers comprises: determining an integer from the decimal value by removing the leading zero and the decimal point; determining an equivalent binary value of the integer value; and determining the binary string of pseudo random numbers as being the determined equivalent binary value where leading zeroes are retained.

In some embodiments, the method comprises determining that a length of a string of the pseudo random numbers is less than a threshold length; performing steps b) to c) to generate further pseudo random numbers; and combining the pseudo random numbers and the further pseudo random numbers to create a combined string of pseudo random numbers.

In some embodiments, the transcendental equation is:

$$e^{-\beta\lambda^2} = -\alpha\lambda Erfc(\lambda)$$

$$\text{where } Erfc(\lambda) = 1 - (2/\sqrt{\pi})\sum_{n=0}^{\infty}[(-1)^n\lambda^{2n+1}]/[(2n+1)(n!)]$$

$$\text{where } e^{-\beta\lambda^2} = \sum_{n=0}^{\infty}(-\beta\lambda^2)^n/n!$$

where $\lambda$ is the solution;
$\alpha$ is a first of the at least one algebraic input parameter value and $\beta$ is a second of the at least one algebraic input parameter value; and
wherein $\alpha$ and $\beta$ are real algebraic numbers.

In some embodiments, the transcendental equation is: $e^{\beta_0}\alpha_1^{\beta_1}\ldots\alpha_n^{\beta_n}=\exp(\lambda)$ with the following analytic solution:

$$\beta_0+\beta_1\cdot\ln(\alpha_1)\ldots\beta_n\cdot\ln(\alpha_n)=\lambda$$

where $\lambda$ is the transcendental number, $\beta_0$ is a non-zero algebraic number, $\beta_1\ldots\beta_n$ are algebraic numbers,
$\alpha_1\ldots\alpha_n$ are non-zero algebraic numbers, and n is an integer and is $\geq 1$; and
wherein the at least one algebraic input parameter value comprises $\beta_0, \beta_1\ldots\beta_n$, and $\alpha_1\ldots\alpha_n$.

In some embodiments, the transcendental equation is $e^{\beta_0}\alpha_1^{\beta_1}=\exp(\lambda)$ with the following analytic solution:

$$\beta_0+\beta_1\cdot\ln(\alpha_1)=\lambda$$

where $\lambda$ is the solution, $\beta_0$ is a non-zero algebraic number, $\beta_1$ is an algebraic number and $\alpha_1$ is a non-zero algebraic number; and
wherein the at least one algebraic input parameter value comprises $\beta_0, \beta_1$ and $\alpha_1$.

The method may be configured to be performed on a device comprising one or more processors and memory comprising instructions, which when executed by the one or more processors cause the device to perform the method.

The method may be configured to be performed by a virtual machine deployed on a host computer comprising one or more processors and memory comprising instructions, which when executed by the one or more processors cause the virtual machine to perform the method.

Some embodiments relate to a non-transitory machine-readable medium storing instructions which, when executed by one or more processors, cause an electronic apparatus to perform any one of the described methods.

Some embodiments relate to device comprising: one or more processors; and memory comprising a non-transitory machine-readable instructions which, when executed by the one or more processors, causes the device to perform any one of the described methods.

The device may be an Internet of Things (IoT) device. The device may be an encryption/decryption device. The device may be configured to perform a security related function whose correct operation depends on accessing numbers that are indistinguishably random from the stand point of statistical testing.

Some embodiments relate to a host computer comprising: one or more processors; memory comprising a non-transitory machine-readable instructions; and one or more virtual machines, each virtual machine being configured to perform the method of any one of the described methods.

Some embodiments relate to a computer implemented method comprising: determining data to be encrypted, wherein the data comprises plaintext converted into a first bit stream; determining an encryption key, wherein the encryption key comprises at least one algebraic input value; generating a set of pseudo random numbers by: using the encryption key as an at least one algebraic input parameter value for a transcendental equation, wherein the transcendental equation comprises a transcendental function capable of generating transcendental number outputs from algebraic number inputs; calculating a solution to the transcendental equation based on the at least one algebraic input parameter value; and generating a pseudo random value based on the solution; determining a second bit stream based on the generated set of pseudo random numbers; performing a stream cipher operation based on the first bit stream and the second bit stream to produce an encrypted bit stream; and outputting the encrypted bit stream.

In some embodiments, performing the stream cipher operation comprises: combining each plaintext digit of the first bit stream with a respective pseudo random number of the second bit stream to produce a respective digit of the encrypted bit stream.

Some embodiments relate to a computer implemented method comprising: determining an encrypted bit stream data to be decrypted; determining a decryption key for decrypting the encrypted bit stream, wherein the decryption key comprises at least one algebraic input value used to generate a bit stream for encrypting the encrypted bit stream data; generating a set of pseudo random numbers by: determining at least one algebraic input parameter value for a transcendental equation, wherein the transcendental equation comprises a transcendental function capable of generating transcendental number outputs from algebraic number inputs, and wherein the at least one algebraic input parameter value comprises the decryption key; calculating a solution to the transcendental equation based on the at least one algebraic input parameter value; and generating a pseudo random number value based on the solution; determining a second bit stream based on the generated set of pseudo random numbers; performing a stream cipher operation based on the encrypted bit stream and the second bit stream to produce a first bit stream; and outputting the first bit stream as the decrypted bit stream.

In some embodiments, performing the stream cipher operation comprises: combining each digit of the encrypted bit stream with a respective pseudo random number of the second bit stream to produce a respective digit of the plaintext bit stream.

Some embodiments relate to a non-transitory machine-readable medium storing instructions which, when executed by one or more processors, cause an electronic apparatus to perform any one of the described methods.

Some embodiments relate to an encryption/decryption system comprising: one or more processors; and memory comprising a non-transitory machine-readable instructions which, when executed by the one or more processors, causes the system to perform any one of the described methods.

BRIEF DESCRIPTION OF DRAWINGS

Embodiments of the present disclosure will now be described by way of non-limiting example only with reference to the accompanying drawings, in which.

DESCRIPTION OF EMBODIMENTS

Figure 1:
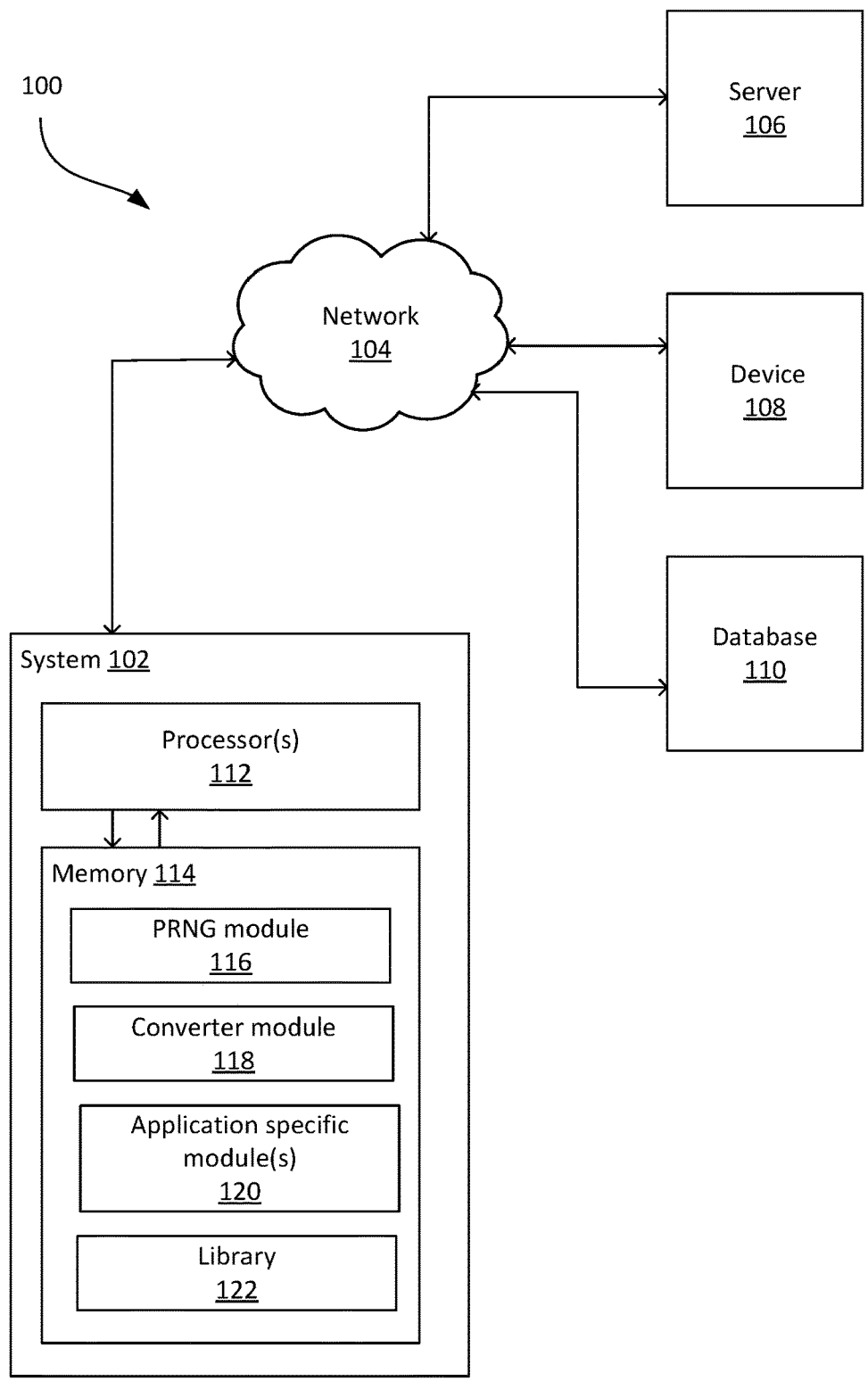
FIG. 1 is a block diagram of a communications system including system configured to generate pseudo random numbers, according to some embodiments.

Described embodiments relate to systems and computer-implemented methods for generating pseudo random numbers based on solutions to transcendental equations. Some embodiments relate to generating pseudo random numbers to address the issue of insufficient entropy (also referred to as entropy starvation) on low-power, constrained IoT devices or virtual machines, for example. Some embodiments relate to generating pseudo random numbers for use in security applications such as encryption and decryption processes.

Embodiments generally relate to systems and computer-implemented methods for generating pseudo random numbers. Some embodiments relate to systems and methods for generating binary strings of pseudo random numbers based on solutions to transcendental equations which are involving one or more transcendental functions of the variable being solved for. Some embodiments relate to systems and methods for generating sequences of pseudo random decimals between 0 and 1 based on solutions to transcendental equations.

A transcendental number is a number that is not algebraic, i.e., a transcendental number is a number that is not a solution of a non-zero polynomial equation with integer coefficients. The adjective "transcendental" is a reference to the number "transcending" algebra. This implies that every transcendental number is irrational (i.e., cannot be represented as the ratio of two integers). Since all irrational numbers have decimal expansions that neither terminate nor become periodic, all transcendental numbers share this property as well.

Similarly, a transcendental function is an analytic function that cannot be expressed as finite sequence of algebraic operations.

The described systems and methods are based on a special subset of transcendental functions that have the known property of generating transcendental number outputs from algebraic number inputs in all but a defined number of cases where algebraic outputs emerge. The concepts of: (i) the "exceptional set" of a transcendental function; and (ii) a "countable set" are relevant to the systems and computer-implemented methods for generating pseudo random numbers described herein. These concepts define which transcendental functions are used in the systems and computer-implemented methods for generating pseudo random numbers described herein.

The definition of the exceptional set of a transcendental function is set out in the introduction to the following paper: D. Marques, F. M. S. Lima, "Some Transcendental Functions with an Empty Exceptional Set", submitted on 10 Apr. 2010 (v1), last revised 25 Aug. 2012 (v2), arXiv: 1004.1668v2 [math.NT] as follows:

"Functions that can be constructed using only a finite number of elementary operations are examples of algebraic functions. A function which is not algebraic is, by definition, a transcendental function—e.g., basic trigonometric functions, exponential function, their inverses, etc. Iff is an entire function, namely a function which is analytic in C, to say that $f$ is a transcendental function amounts to say that it is not a polynomial. By evaluating a transcendental function at an algebraic point of its domain, one usually finds a transcendental number, but exceptions can take place. For a given transcendental function, the set of all exceptions (i.e., all algebraic numbers of the function domain whose image is an algebraic value) form the so-called exceptional set . . . "

A "countable set" means a set with the same cardinality (i.e., number of elements) as some subset of the set of natural numbers. A countable set is either a finite set or a countably infinite set. For example, the facts that: (i) all algebraic real numbers form a countably infinite set; and (ii) all real numbers form an uncountably infinite set were proven by the German mathematician Georg Cantor in 1874. By implication, all real transcendental numbers necessarily form an uncountably infinite set since, by definition, the real numbers are the union of algebraic and transcendental numbers. As a corollary to the preceding points, "almost all" real numbers are transcendental numbers. The term "almost all" here has a precise mathematical meaning—it means all other than a negligible subset (in the sense that the set of exceptions has Lebesgue measure zero).

A transcendental function which has an exceptional set whose elements comprise a countable set that does not include all algebraic numbers is hereafter referred to as a "Countable Exceptional Set Transcendental Function".

In some embodiments, the described systems and methods are based on Countable Exceptional Set Transcendental Functions. In some embodiments of the systems and computer-implemented methods for generating pseudo random numbers described herein, the Countable Exceptional Set Transcendental Function will have an exceptional set that is countably finite (which is taken to include the case where the exceptional set is empty) or is countably infinite but which is only a negligible sub-set of the algebraic numbers (in the sense that the set of exceptions has Lebesgue measure zero). For example, the exponential function, ex, is a transcendental function whose exceptional set is countably finite in that it has only one algebraic number in its exceptional set, namely, x=0. The function $a^b$ is a transcendental function whose exceptional set is countably infinite and is only a negligible sub-set of the algebraic numbers. According to the Gelfond-Schneider theorem, where a is an algebraic number (not equal to either 0 or 1) and b is an irrational algebraic number, the function yields a transcendental number, and where a is an algebraic number and b is a rational algebraic number, the function yields an algebraic number.

As a practical matter, the choice of particular Countable Exceptional Set Transcendental Function for a given application is informed, partly at least, by a consideration of the size of its exceptional set. Where the exceptional set of the particular Countable Exceptional Set Transcendental Function is: (i) countably finite; or (ii) countably infinite but nonetheless a negligible sub-set of the algebraic numbers; or (iii) countably infinite but neither the exceptional set nor the non-exceptional set is a negligible sub-set of the algebraic numbers, the corresponding transcendental equation can be structured so that the likelihood of an input to the function being selected as one of the exceptional set is remote, and even if it did occur, it would have negligible impact on the performance of the PRNG.

Transcendental functions with the property of "algebraic numbers in/transcendental numbers out" (with a countable set of exceptions) are characteristic of Countable Exceptional Set Transcendental Functions. The importance of such transcendental functions in computer/software applications arises because a computer/device used to generate the outputs can only hold a finite number of digits in its inputs and, as such, the inputs are always algebraic numbers.

The described systems and methods may generate pseudo random numbers based on approximations to transcendental numbers. Specifically, in some embodiments, the described systems and methods generate a sequence of numbers whose leading digits correspond to the leading digits of a transcendental number. The approximate nature of these results arises from: (i) the specific computational methods used; (ii) the limitations of the computing equipment/device on which they are generated (primarily limitations on the number of digits that are stored on the computing equipment/device); and (iii) limitations in the accuracy of the mathematical functions used in the software language in which the described method is coded.

The approximate transcendental numbers results may be converted or processed into a sequence of decimals between 0 and 1, and then, in some embodiments, into a bit stream. The generated transcendental numbers may be used for a variety of applications as discussed in further detail below.

In some embodiments, the digits generated by the described systems and methods on the computer/device may match the corresponding digits of the transcendental number to the full extent of the floating point numbers held in the memory of the computer/device; however, even where this situation exists, the resulting number is an approximation of the actual transcendental number due to the factors listed immediately above under points (ii) and (iii).

It is noted that "almost all" of, for example, the decimals and bits generated represent samples from a sequence of "normal numbers". That is, when an infinitely long string of digits is considered, the relative frequency of each digit from 0 to 9 is the same and that for the corresponding bit stream derived from the decimals, the relative frequency of 0 and 1 is the same. The mathematical basis for the conclusion that "almost all" of the decimals and bits generated represent samples from a sequence of "normal numbers" even though they represent approximations of a transcendental number is set out in the theorem by the French mathematician Emile Borel in 1909 that "almost all" real numbers are normal numbers. As a corollary to this, "almost all" real numbers are, in fact, normal in every base (these are known as "absolutely normal" numbers). As before, the term "almost all" here has a precise mathematical meaning—it means all other than a negligible subset (in the sense that the set of exceptions has Lebesgue measure zero).

Normal numbers, as explained below, have a property of equidistribution of digits and, since the digits in each distinct, for example, decimal number generated by the described methods and systems in almost all instances represents a sample of the leading digits from a distinct normal number, the sequence of decimal numbers is statistically indistinguishable from an unbiased random sequence of distinct decimals between 0 and 1 when a large number of distinct decimals is considered even though each decimal generated has a finite number of digits within it. The sequences of decimals can be easily converted to a corresponding stream of 0's and 1's while retaining the normality property.

The only limitation on the statistical behaviour of the bit stream is the risk of a collision (i.e., a repeated sequence) due to the computing equipment/device having a finite memory and carrying a finite number of floating digits.

Transcendental equations involve one or more transcendental functions of the variable being solved for and it is often the case that they cannot often be solved using algebraic operations. In other words, a transcendental equation is an equation containing a transcendental function of the variable(s) being solved for. For example, transcendental equations where the variable to be solved for appears only once, as an argument to the transcendental function, can be solved, with inverse functions and/or be evaluated directly; however, where the transcendental equation is more complex, such as where the variable appears both as an argument to a transcendental function and elsewhere in the equation it is usually not solvable using algebraic operations or have trivial solutions. In these cases, the solution may be found using "root finding" algorithms.

In some embodiments, the transcendental equation comprises at least one Countable Exceptional Set Transcendental Function and, separately, a non-linear function of the variable being solved for with any number of given algebraic parameters where a root finding algorithm or similar method must be employed. The inclusion of the non-linear function of the variable being solved for in such circumstances is a design feature to avoid those cases where an algebraic input to the Countable Exceptional Set Transcendental Function generates an algebraic number and, as a result, provide further obfuscation. This is achieved by choosing a suitable non-linear function of the variable being solved for such that no member of the exceptional set of the Countable Exceptional Set Transcendental Function is a solution of the transcendental equation. By way of example, the Erfc($\lambda$) component of the transcendental equation in eqn 1 below performs this role.

In some embodiments, the described systems and methods generate an approximation to a transcendental number by directly solving a transcendental equation comprised of at least one Countable Exceptional Set Transcendental Function for any number of given algebraic parameters and inputs.

In some embodiments, the solution to a transcendental equation comprises a non-vanishing linear combination of a finite number of logarithms of non-zero algebraic numbers with algebraic coefficients where the constant term is not equal to zero where this combination, when evaluated, will always produce a transcendental number. This evaluated number is taken to be the solution for the purposes of the systems and computer-implemented methods for generating pseudo random numbers.

In some embodiments, the described systems and methods generate an approximation to a transcendental number based on a combination of one or more transcendental equations and/or functions comprising one or more Countable Exceptional Set Transcendental Functions for any number of given algebraic parameters and inputs.

Unlike some known techniques for producing pseudo random numbers, the statistical behaviour of the output produced by the described methods and systems does not rely on a complicated series of iterated algebraic calculations to generate the stream of pseudo random numbers.

Extensive statistical testing of the described methods and systems using the PractRand battery of statistical tests has confirmed that the bit streams generated do have the expected statistical properties of normality implied by mathematical theory. For example, two separate tests each comprising 256 terabytes of binary data in June and August 2020 passed PractRand.

System Architecture

Referring now to FIG. 1, there is shown a block diagram of a system 102 configured to generate pseudo random numbers, according to some embodiments. In some embodiment, as illustrated, the system 100 is deployed in a communications system 100 and is configured to communicate with one or more remote devices, servers and/or databases over a communications network 104. For example, the system 102 may communicate with one or more of server 106, device 108 and database 110. Examples of a suitable communications network 104 include cloud server network, wired or wireless internet connection, Bluetooth™ or other near field radio communication, and physical media such as USB. The system 102 comprises one or more processor(s) 112 and memory 114.

Processor(s) 112 is configured to execute instructions stored in memory 114 to cause the PRNG system 102 to generate pseudo random numbers, according to the described methods. Processor 112 may comprise one or more microprocessors, central processing units (CPUs), application specific instruction set processors (ASIPs) or other processors capable of reading and executing instruction code.

Memory 114 may comprise one or more volatile or non-volatile memory types, such as RAM, ROM, EEPROM, or flash, for example. Memory 114 may be configured to store executable code modules for execution by processor 112. For example, memory 114 may comprise one or more programs or modules comprising computer executable code, which when executed by the one or more processors 112 causes the PRNG system 102 to perform certain functionality. For example, as illustrated, memory 114 comprises a PRNG module 116, which is configured to determine a solution to a transcendental equation based on one or more algebraic input values, wherein the transcendental equation comprises a transcendental function that is configured to or capable of generating transcendental number outputs from algebraic number inputs. For example, the transcendental function may be associated with an exceptional set, wherein the transcendental function will produce a transcendental number for all input values that do not belong to the exceptional set, and an algebraic number for all input parameter values that do belong to the exceptional set. The exceptional set comprises a countable exceptional set, which may be finite (i.e., zero or a fixed number) or infinite but where the exceptional set still forms a negligible sub-set of all algebraic numbers (in the same sense as having a Lebesgue measure of zero).

Memory 114 may comprise a converter module 118 configured to convert numbers generated by the PRNG module 116 into strings of pseudo random numbers. The converter module 118 may be configured to convert a number generated by the PRNG module 116 into a decimal value between zero and one. In some embodiments, the converter module 118 may also be configured to convert the decimal value into a binary string of pseudo random numbers. For example, the converter module 118 may assign one of a zero or a one to each even digit of the decimal value and assign the other of a zero or a one to each odd digit of the decimal value. In some embodiments, the converter module 118 may determine which of a one or zero to assign to even digits and odd digits by determining whether or not (i) the decimal value or, alternatively, (ii) a decimal generated in a prior iteration is greater than 0.5. For example, if the decimal or the decimal generated in a prior iteration (e.g. the most recent iteration), is greater than 0.5, the converter module 118 may assign a one to even digits and a zero to odd digits, or vice versa. The converter module 118 may be configured to convert a number generated by the PRNG module 116 into a number of any base, including bits (base 2), decimals (base 10), and bases other than 2 or 10.

In some embodiments, the converter module 118 may convert the decimal value into a binary string of pseudo random numbers by replacing each digit of the decimal value with the last bit of its equivalent ASCII character.

Alternatively, the converter module 118 may convert the number into the binary string by: (i) conversion of the number into an integer based on the digits following the decimal point; (ii) determining an equivalent binary value of the integer; and (iii) determining the binary string of pseudo random bits as being the determined equivalent binary value of the integer. For example, this may involve restating the string of decimal digits as an n digit integer and then converting this integer into its equivalent binary value where leading zeroes are retained.

Memory 114 may further comprise one or more application specific module(s) 120 configured to process outputs from the PRNG module 116 and/or the converter module 118 to perform some process for a specific application, such as encryption applications, as will be discussed in more detail below. However, it will be appreciated that in some embodiments, the application specific module(s) 120 may be deployed on some remote or external server or device, such as server 106 and/or device 108, which may be configured to communicate with the system 102 to receive the pseudo random numbers.

As discussed in more detail below, the PRNG module 116 generates numbers (e.g., decimal numbers, binary numbers or numbers that are neither decimal numbers nor binary numbers) that are uniformly distributed and are statistically high quality coupled with a high level of resistance to the birthday problem collisions. This makes them suitable for a variety of applications. Examples of suitable applications include:

Key and seed generation for data security and encryption applications (for example, the generation of high quality seeds on devices and virtual machines lacking access to suitably random seeds or having a low level of available entropy available from which suitably random seeds could be constructed);

Hashing (i.e., as hashing function for authentication, certification, and pseudonymisation);

Securing data at rest and in motion (i.e., as an encryption protocol in its own right such as a stream cipher or for use in conjunction with other existing CSPRNGs (a Cryptographically Secure PRNG) and PRNGs and data transmission/communications protocols);

De-biasing and conditioning of raw entropy output from TRNG;

Generation of identifiers for use in IT systems for devices, equipment and locations (e.g., MAC number generation and randomisation);

Generation of random numbers for use in modelling (such as for use in Monte Carlo analysis and similar methods) in physics, engineering, artificial intelligence/machine learning, computational biology, mathematics, social sciences and financial markets/commerce. Examples include the generation of random numbers for use in modelling of fluid flows, numerical weather forecasting, economics phenomena, artificial intelligence for games, and the evaluation of derivatives and credit portfolio risk and return in financial markets); and Electronic gaming and lottery applications (e.g., electronic gaming machines, online gaming applications and lottery machines).

Memory 114 may also include a database or library 122 for storing data, such as values for use as input parameters for generating numbers using the derived from data received from one or more of the server 106, device 108 and/or database 110. For example, the stored input parameter values may be derived from data received from a random noise source. In some embodiments, stored input parameter values may be derived from pseudo random numbers previously generated by the PRNG system 102. Suitable values for input parameters for the PRNG module 116 may be determined based on specific requirements for end applications of the pseudo random number string and/or on the characteristics of the particular Countable Exceptional Set Transcendental Function or functions used in system 102, for example, and as will be discussed in more detail below.

In some embodiments, underlying physical processes are used as a source of randomness as values for input parameters for the PRNG module 116. For example, one or more input parameter values may be derived from data based on nuclear decay detection, quantum mechanical noise source in electronic circuits; photon streams through a partially silvered mirror; operator based sources such as timing between key strokes, etc.; atmospheric noise; and thermal noise in electronics. In some embodiments, one or more input parameter values may be derived from the physical behaviour of a device or network. Examples include clock drift, mouse and keyboard input, network traffic, add-on hardware devices, or images gathered from changing subject matter can also be used as input values. In such embodiments, the values may be converted into or stored as values (e.g., decimal numbers, binary numbers or numbers that are neither decimal numbers nor binary numbers) in library 122 for use in the parameters used to calculate the approximate solutions to transcendental equations by PRNG module 116.

Generating Transcendental Numbers

As mentioned above, the PRNG module 116 is configured to or capable of generating approximate transcendental numbers as solutions to transcendental equations based on at least one Countable Exceptional Set Transcendental Function for the given algebraic input parameter value(s).

In those instances where the transcendental equation cannot be evaluated directly using algebraic operations in this setting, as mentioned above, the solution is generated using some form of root finding algorithm.

In some embodiments, the transcendental equation may be represented by the following:

$$e^{-\beta\lambda^2} = \alpha\lambda \text{Erfc}(\lambda) \quad \text{(eqn 1)}$$

where e is an exponential function, $$e^x = \sum_{n=0}^{\infty} x^n/n!,$$

is the Countable Exceptional Set Transcendental Function, and Erfc( ) is a complementary error function and is defined as follows:

$$\text{Erfc}(x) = 1 - (2/\sqrt{\pi})\sum_{n=0}^{\infty}[(-1)^n x^{n+1}]/[(2n+1)(n!)]$$

$\alpha$ and $\beta$ are parameters having values that are real algebraic numbers >0;

and $\lambda$ is the transcendental number that will solve the equation.

As mentioned above, there are several "root finding" algorithms that can be used to solve this and other transcendental equations from a given starting point, k, (as discussed in more detail below).

In the above embodiments, as the exponential function appears on the left hand side of each transcendental equation, it can be said that for any given value of the right hand side held in the computer's memory, it may always be represented by a finite number of digits and, as such, this number may always be an algebraic number (because a finite number of digits (e.g., decimal numbers, binary numbers or numbers that are neither decimal numbers nor binary numbers) is always a rational number and all rational numbers are algebraic numbers).

As x=0 (which is the only value of x for which ex is algebraic) is never a solution to the transcendental equation listed above and since the exponential function used in the transcendental equation is always being set equal to an algebraic number in the computer, it is necessarily the case that the exponent (i.e., the "x") is a transcendental number and, because the $\alpha$, $\beta$ and start point parameters are themselves algebraic (again due to the limited number of digits), the solution to eqn 1 has a transcendental number as its solution.

The exponential function in most software languages is represented by a finite number of terms taken from the series expression for the exponential function shown above. As such, it is inevitable that the solution to the transcendental equation for a given $\alpha$ and $\beta$ parameter value in the example of eqn 1 will be an approximation only and that the approximation is limited not only by the start point and the number of iterations (if a numerical method is adopted for solving the transcendental equation) or the number of terms used (if an analytic approximation method is used for solving the transcendental equation) or where an analytic approximation is used iteratively but also by the limited number of terms in the software expression for the exponential function itself.

Despite these limitations, the leading digits in the solution will mirror the actual solution to the extent these limitations collectively permit.

The following considerations may inform limits placed on $\alpha$, $\beta$ and the start point parameters:

- For any value of $\alpha>0$ and $\beta>0$, there is only one real solution to the transcendental equation;
- The exponential part (i.e., the $e^{-\beta\lambda^2}$ component) of the transcendental equation becomes progressively smaller but always remains positive as $|\lambda|$ becomes very large;
- The complementary error function part (i.e., the $-\alpha\lambda\text{Erfc}(\lambda)$) component of the transcendental equation) is zero at $\lambda=0$, remains negative where $\lambda>0$ and approaches zero where $\lambda$ becomes very large—in other words, for all values of $\lambda>0$ the exponential part and the complementary error function part never intersect;
- The complementary error function part (i.e., the $-\alpha\lambda\text{Erfc}(\lambda)$ component of the transcendental equation) is zero at $\lambda=0$, remains positive where $\lambda<0$ and approaches a limit equal to $-2\alpha\lambda$ where $\lambda$ has a large negative value—in other words, for all values of $\lambda<0$ the exponential part and the complementary error function part only intersect once.

Figure 2:
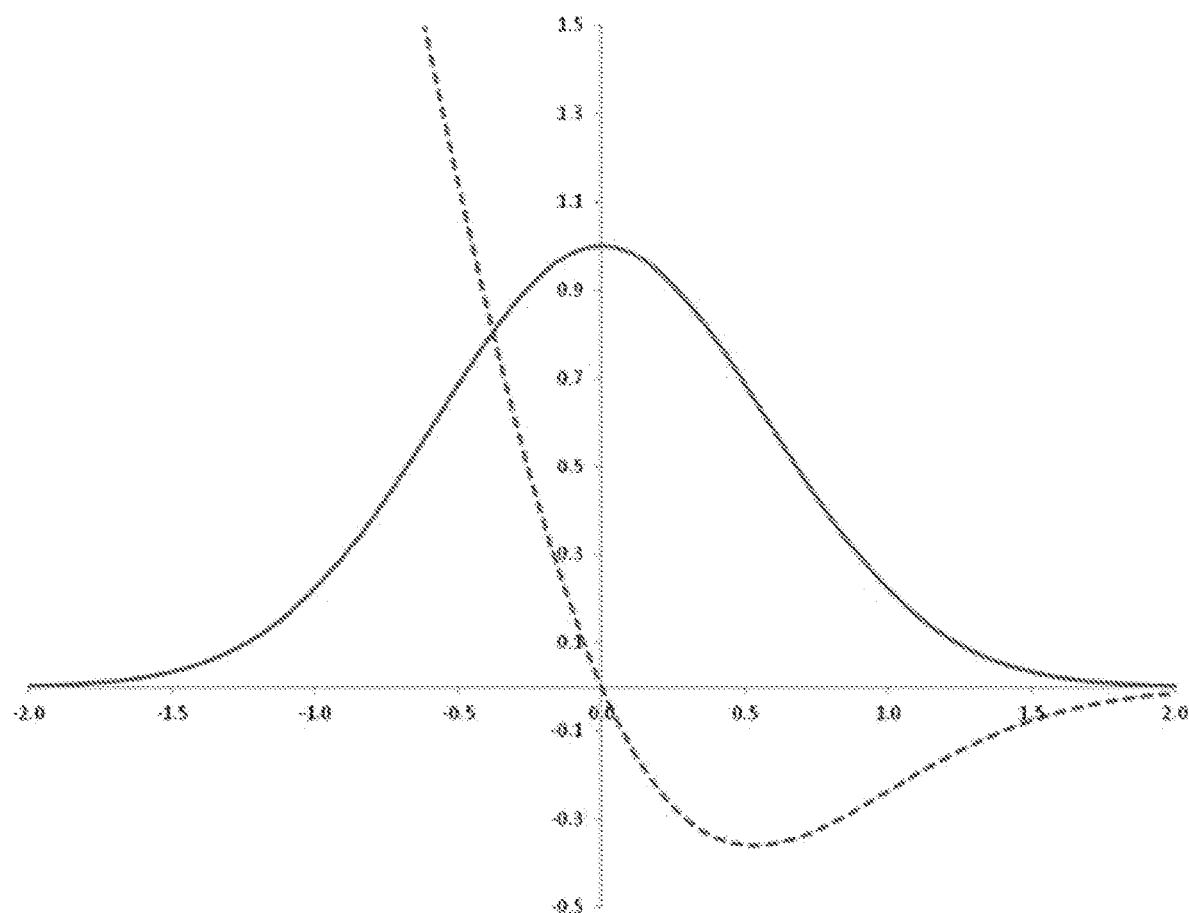
FIG. 2 is a graph of $e^{-\beta\lambda^2}$, and $-\alpha\lambda \mathrm{Erfc}(\lambda)$ components of a transcendental equation plotted against, A (shown on the horizontal axis), where a value of A for which the two curves intersect is the solution to the transcendental equation, where a and both equal 1.5.

FIG. 2 is a plot of the two components of the transcendental equation (eqn 1) (being the $e^{-\beta\lambda^2}$ and $-\alpha\lambda\text{Erfc}(\lambda)$ components of a transcendental equation plotted against, $\lambda$) in the case where $\alpha$ and $\beta$ are both equal to 1.5. Since the shape of the exponential component and complementary error function components remain the same for all values of $\alpha>0$ and $\beta>0$, any real number greater than zero can be used, in principle, which ensures that the solution is always a unique negative real number.

In some embodiments, the range of $\alpha$ and $\beta$ parameter values may be constrained to mitigate against the chance of the solutions of the transcendental equation being concentrated within a too small range of values of $\lambda$. In some embodiments, the value of the $\alpha$ parameter is selected to be a fixed real valued number that ranges between 1 and 8, and the value of the $\beta$ parameter is selected to be a fixed real valued number that ranges between 1 and 8. In some embodiments, the $\alpha$ and $\beta$ parameter values are selected from a smaller range, such as between 1 and 4. In some embodiments, the $\alpha$ and $\beta$ parameters are generated by using the following formulation:

$\alpha=C_1+C_2$ times a uniform random variable between 0 and 1 where $C_1$ is $\geq 0$ and $C_2$ is $>0$ or $C_1$ is $>0$ and $C_2$ is $>0$ such that $\alpha$ is $>0$; and $\beta \times C_3+C_4$ times a uniform random variable between 0 and 1 where $C_3$ is $\geq 0$ and $C_4$ is $>0$ or $C_3$ is $>0$ and $C_4$ is $\geq 0$ such that $\beta$ is $>0$.

The uniform random variable may be obtained from: another pseudo random number generator, such as the Mersenne Twister PRNG, external sources of noise/randomness (e.g., externally generated entropy from a third party source or entropy generated by the system 102 or device on which the PRNG module 116 operates after appropriate whitening and processing), as for example, may be retrieved from the library 122; and/or an output from a prior iteration of the PRNG module 116 itself (e.g., using part or all of the output from prior computations of the numbers (e.g., decimal numbers, binary numbers or numbers that are neither decimal numbers nor binary numbers)) as may be retrieved from the library 122 such that a distinct transcendental equation is solved in each iteration of the PRNG module 116.

The typical "average" and "median" solution, $\lambda$, for various ranges of $\alpha$ and $\beta$ are summarised in Table 1 below:

TABLE 1

| $\alpha$ and $\beta$ Range Case | Indicated "Average" Solution Value for $\lambda$ | Indicated "Median" Solution Value for $\lambda$ |
| --- | --- | --- |
| 1-2 | −0.381 | −0.375 |
| 2-3 | −0.266 | −0.266 |
| 3-4 | −0.203 | −0.201 |
| 4-5 | −0.165 | −0.165 |
| 5-6 | −0.142 | −0.142 |
| 6-7 | −0.123 | −0.122 |
| 7-8 | −0.109 | −0.109 |

The results tabled in Table 1 are examples of approximated solutions to the transcendental equation of eqn 1 for given $\alpha$ and $\beta$ ranges. These results have been rounded to three decimal places to help inform an appropriate choice of starting point where a fixed starting point for the "root finding" algorithms is desired in specific end uses.

In some embodiments, restrictions on the selection of $\alpha$ and, $\beta$ parameters may depend on the application to which the pseudo random decimal numbers, binary numbers or numbers that are neither decimal numbers nor binary numbers is to be applied.

Similar considerations may apply to the selection of the start point k used for the "root finding" algorithms and, for example, in relation to eqn 1 the only specification needed is that it be a real valued number $<0$ (0 is never a solution of eqn 1) as the starting point.

If, however, the specific application requires the starting point to itself be an input driven by a random process, then the start point, k, may be selected in relation to eqn 1 as follows:

$k=C_5$ times a uniform random variable between 0 and 1, where $C_5$ is $<0$

In some embodiments, a value for the start point k may be retrieved from previously generated pseudo random numbers as may be stored in library 122. This may be appropriate in particular in situations where a value for the start point k is required at start-up and there is an insufficient amount of on device entropy or entropy from a third party source and/or the use of a PRNG is not considered appropriate.

The initial values of $\alpha$, $\beta$ and the start point parameters for use in a root finding algorithm (as discussed below) may be seeded from on-device random noise or from a pre-existing pool of entropy stored in the library 122.

In some embodiments, the generation of pseudo random numbers may be achieved by calculating the value of a non-vanishing linear combination of a finite number of logarithms of non-zero algebraic numbers with algebraic coefficients where the constant term is not equal to zero.

For example, the transcendental equation may be represented by $e^{\beta_0}\alpha_1^{\beta_1} \ldots \alpha_n^{\beta_n}=\exp(\lambda)$ with the following analytic solution:

$$\beta_0+\beta_1\cdot\ln(\alpha_1)+ \ldots +\beta_n\cdot\ln(\alpha_n)=\lambda \qquad (\text{eqn 2})$$

where the parameter $\beta_0$ is a non-zero algebraic number, the parameters $\beta_1 \ldots \beta_n$ are algebraic numbers, the parameters $\alpha_1 \ldots \alpha_n$ are non-zero algebraic numbers, n is any positive integer $\geq 1$ and $\lambda$ is the transcendental number whose value is to be calculated directly. Eqn 2 is an analytic solution of a transcendental equation whose exceptional set is countably finite in that it has no algebraic numbers in its exceptional set.

A specific example of a formulation that uses finite linear combinations of logarithms of non-zero algebraic numbers with algebraic coefficients as a means of generating transcendental numbers is as follows:

$$\beta_0 + \beta_1 \cdot \ln(\alpha_1) = \lambda \qquad \text{(eqn 3)}$$

where the parameter $\beta_0$ is a non-zero algebraic number, the parameter $\beta_1$ is an algebraic number, the parameter $\alpha_1$ is a non-zero algebraic number and $\lambda$ is the transcendental number whose value is to be calculated directly. Eqn 3 is an analytic solution of a transcendental equation whose exceptional set is countably finite in that it has no algebraic numbers in its exceptional set.

As with the transcendental equation described above (eqn 1), the values calculated on a computer or device using eqn 2 and/or eqn 3 are approximations to transcendental numbers.

In some embodiments, further restrictions to the coefficients (or parameters) may apply. For example, specific restrictions on values for the coefficients may be desirable for particular end use applications. In some embodiments, a specific end use application may require ranges for the values of the coefficients (i.e., the parameter $\beta_0$ and the parameters $\beta_1 \ldots \beta_n$) to be specifically constrained to ensure a given range of parameter values are used.

In some embodiments, the values for the $\beta_0$, $\beta_1$, and $\alpha_1$ parameters in eqn 3 may be obtained by using the following formulation:

$\alpha_1 = K_1 + K_2$ times a uniform random variable between 0 and 1, where $a_1$ is $>0$ (this last restriction is required where the systems and computer-implemented methods are unable to deal with complex numbers);

$\beta_0 = K_3 + K_4$ times a uniform random variable between 0 and 1 where $\beta_0$ is algebraic and does not equal 0; and $\beta_1 = K_5 + K_6$ times a uniform random variable between 0 and 1 where pi is algebraic.

The uniform random variable may be obtained from another: pseudo random number generator, such as the Mersenne Twister PRNG; external sources of noise/randomness (e.g., externally generated entropy from a third party source or entropy generated by the system 102 or device on which the PRNG module 116 operates after appropriate whitening and processing), as for example, may be retrieved from the library 122; and/or an output from a prior iteration of the PRNG module 116 itself (e.g., using part or all of the output from prior computations of the numbers (e.g., decimal numbers, binary numbers or numbers that are neither decimal numbers nor binary numbers) as may be retrieved from the library 122 such that a distinct transcendental equation is solved in each iteration of the PRNG module 116.

The initial values of the parameter $\beta_0$, the parameters $\beta_1 \ldots \beta_n$ and the parameters $\alpha_1 \ldots \alpha_n$ may be seeded from on-device random noise or from a pre-existing pool of entropy stored in the library 122.

Solving Transcendental Equations

The PRNG module 116 may be configured to determine solutions to the transcendental equation using any suitable root finding algorithms where direct evaluation of the transcendental number using an analytic solution to the transcendental equation is not an available option. For example, appropriate algorithms may include numerical methods, such as Newton's method and its higher order forms such Halley's method or analytic formula approximation techniques such as homotopy analysis.

Numerical methods such as Newton's method and Halley's method may involve performing iterated steps to derive progressively improved estimates of the solution—by way of example, Newton's method, starting with an initial guess/estimate of the solution, xo, to identify the value of x for which $f(x)=0$ is shown below where $f(x)$ is the transcendental equation and $f'(x)$ denotes the first derivative of $f(x)$ with respect to x:

$$x_{n+1} = x_n - f(x_n)/f'(x_n)$$

In the case of the transcendental equation in eqn 1 set out above, the equation is recast to determine the function $f(\lambda)$ for use in Newton's Method as follows (with $\lambda$ in place of x):

$$f(\lambda) = e^{-\beta\lambda^2} + \alpha\lambda \text{Erfc}(\lambda) = 0$$

Higher order methods, such as Halley's method, tend to be more complicated but offer an improved rate of convergence to the exact solution (i.e., it takes fewer iterations to achieve a given maximum error between the exact solution and the approximation at the expense of additional computational overhead).

The homotopy analysis approach presents the solution to the transcendental equation in terms of a Taylor series comprised of an infinite series of formulae based on the solution to a simpler but related mathematical problem. The first five terms of the homotopy series expression for the solution to the transcendental equation set out above (eqn 1) is shown below:

$$\lambda = X0/0! + X1/1! + X2/2! + X3/3! + X4/4! \ldots$$

where:

X0=the initial start point (or where the homotopy series is re-used in a series of calculations, the previously calculated approximate solution to the transcendental equation)

$$X1 = -\frac{e^{X_0^2}\sqrt{\pi}\left(1 + e^{X_0^2\beta}X0\alpha \text{Erfc}[X0]\right)}{-2e^{X_0^2\beta}X0\alpha - 2e^{X_0^2}X0\sqrt{\pi}\beta + e^{X_0^2 + X_0^2\beta}\sqrt{\pi}\alpha \text{Erfc}[X0]}$$

$$X2 = \frac{2\left(-2e^{X_0^2\beta}\alpha + 2e^{X_0^2\beta}X0^2\alpha - e^{X_0^2}\sqrt{\pi}\beta + 2e^{X_0^2}X0^2\sqrt{\pi}\beta^2\right)X1^2}{2e^{X_0^2\beta}X0\alpha + 2e^{X_0^2}X0\sqrt{\pi}\beta - e^{X_0^2(1+\beta)}\sqrt{\pi}\alpha \text{Erfc}[X0]}$$

$$X3 = -\frac{2X1\left(-8e^{X_0^2\beta}X0\alpha X1^2 + 4e^{X_0^2\beta}X0^3\alpha X1^2 - 6e^{X_0^2}X0\sqrt{\pi}\beta^2 X1^2 + 4e^{X_0^2}X0^3\sqrt{\pi}\beta^3 X1^2\right)}{2e^{X_0^2\beta}X0\alpha + 2e^{X_0^2}X0\sqrt{\pi}\beta - e^{X_0^2(1+\beta)}\sqrt{\pi}\alpha \text{Erfc}[X0]} -$$

$$X4 = \frac{2X1\left(6e^{X_0^2\beta}\alpha X2 - 6e^{X_0^2\beta}X0^2\alpha X2 + 3e^{X_0^2}\sqrt{\pi}\beta X2 - 6e^{X_0^2}X0^2\sqrt{\pi}\beta^2 X2\right)}{2e^{X_0^2\beta}X0\alpha + 2e^{X_0^2}X0\sqrt{\pi}\beta - e^{X_0^2(1+\beta)}\sqrt{\pi}\alpha \text{Erfc}[X0]}$$

$$+ \frac{\left(2\left(8e^{X_0^2\beta}\alpha X1^4 - 28e^{X_0^2\beta}X0^2\alpha X1^4 + 8e^{X_0^2\beta}X0^4\alpha X1^4 + 6e^{X_0^2}\sqrt{\pi}\beta^2 X1^4 - 24e^{X_0^2}X0^2\sqrt{\pi}\beta^3 X1^4\right)\right)}{2e^{X_0^2\beta}X0\alpha + 2e^{X_0^2}X0\sqrt{\pi}\beta - e^{X_0^2(1+\beta)}\sqrt{\pi}\alpha \text{Erfc}[X0]} +$$

$$\frac{\left(2\left(8e^{X_0^2\beta}X0^4\sqrt{\pi}\beta^4 X1^4 + 48e^{X_0^2\beta}X0\alpha X1^2 X2 - 24e^{X_0^2\beta}X0^3\alpha X1^2 X2 + 36e^{X_0^2}X0\sqrt{\pi}\beta^2 X1^2 X2\right)\right)}{2e^{X_0^2\beta}X0\alpha + 2e^{X_0^2}X0\sqrt{\pi}\beta - e^{X_0^2(1+\beta)}\sqrt{\pi}\alpha \text{Erfc}[X0]} +$$

$$\frac{\left(2\left(-24e^{X_0^2}X0^3\sqrt{\pi}\beta^3 X1^2 X2 - 6e^{X_0^2\beta}\alpha X2^2 + 6e^{X_0^2\beta}X0^2\alpha X2^2 - 3e^{X_0^2}\sqrt{\pi}\beta X2^2 + 6e^{X_0^2}X0^2\sqrt{\pi}\beta^2 X2^2\right)\right)}{2e^{X_0^2\beta}X0\alpha + 2e^{X_0^2}X0\sqrt{\pi}\beta - e^{X_0^2(1+\beta)}\sqrt{\pi}\alpha \text{Erfc}[X0]} +$$

-continued $$\frac{\left(2\left(-8e^{X_0^2\beta}\alpha X1X3 + 8e^{X_0^2\beta}X0^2\alpha X1X3 - 4e^{X_0^2}\sqrt{\pi}\beta X1X3 + 8e^{X_0^2}X0^2\sqrt{\pi}\beta^2 X1X3\right)\right)}{2e^{X_0^2\beta}X0\alpha + 2e^{X_0^2}X0\sqrt{\pi}\beta - e^{X_0^2(1+\beta)}\sqrt{\pi}\alpha Erfc[X0]}$$

It is practically infeasible to carry out an infinite number of iterations using a numerical method or to compute the formulae for an infinite number of terms in a Taylor series-style of solution, considering the complexity of the $3^{rd}$, $4^{th}$ and $5^{th}$ terms in the homotopy series. Nonetheless, with such methods, it emerges that a relatively small number of iterations or terms comprising explicit formulae (depending on the solution methodology used) may be sufficient to obtain a suitable approximation to the exact the solution.

Practically speaking, because any computer on which the root finding algorithm is used can only carry a finite number of digits in its memory, the solutions calculated by PRNG module 116 by either a numerical approach or through a single formula are approximations: in the case of the numerical approach, the accuracy of the solution improves as the number of steps increases; and likewise, the analytic formula approximation approach involves generating a solution in the form of an infinite series which increases in accuracy as more terms are added to the series.

Properties of Transcendental Numbers Generated by the PRNG Module

As discussed above, the PRNG module 116 is configured to determine solutions to transcendental equations, such as eqn 1, to generate a finite sequence of digits which may, in circumstances where the precision of the calculation carried out by the PRNG module 116 is less than the number of digits generated, represent a portion of a transcendental number followed by a sequence of "residual digits" (i.e., the trailing digits that do not match the corresponding digits in the transcendental number to which the approximate solution relates).

In "almost all" instances, as mentioned above, the sequence of digits generated (including the residual digits) will correspond to a sample from a normal number and the overall sequence of digits will correspond to a series of these samples from different normal numbers as mentioned above. Accordingly, the aggregation of these sequences can be expected to display the properties of normality and can be expected to retain this property where conversion of, for example, decimal digits to bits occurs or where bits are generated directly. Furthermore, in software utilised by the PRNG module 116, the mathematical precision can usually be set to ensure that the approximate solution matches the exact solution of the transcendental equation to the extent of the available pre-set floating point precision of the software.

In general, random number generators face a limitation imposed because of the limited number of digits carried in the machine, such as system 102, on which the PRNG module 116 is deployed. It is it inevitable that at some point a repeated result will emerge in terms of the approximate solutions to the transcendental equation as determined by the PRNG module 116 (this is known as the "Birthday Problem"). This may be alternately phrased as the number of random samples needing to be drawn from a finite population before the probability of at least one repeated result (i.e., a "birthday collision") occurring exceeds a given threshold.

For the described embodiments, a limiting factor may be the number of digits (e.g., decimal numbers, binary numbers or numbers that are neither decimal numbers nor binary numbers) produced by the PRNG module 116 when a transcendental number is generated. In an embodiment where the PRNG module 116 is configured to solve eqn 1 to generate 384 digit solutions as an output where the decimal digits are converted to 0's or 1's depending on the digits being even or odd numbers, the corresponding approximate birthday problem probabilities are set out in Table 2 below.

TABLE 2

| Probability of at Least One Repeated Result (Threshold Probability) | Total Possible Outputs | Approximate Number of Random Samples (to 2 Significant Figures) |
|---|---|---|
| $10^{-6}$ | $2^{384}$ = approx. $3.9 \times 10^{115}$ | $8.9 \times 10^{54}$ |
| $10^{-9}$ | $2^{384}$ = approx. $3.9 \times 10^{115}$ | $2.8 \times 10^{53}$ |
| $10^{-12}$ | $2^{384}$ = approx. $3.9 \times 10^{115}$ | $8.9 \times 10^{51}$ |
| $10^{-15}$ | $2^{384}$ = approx. $3.9 \times 10^{115}$ | $2.8 \times 10^{50}$ |

Table 2 shows how the potential range of outcomes needs to be much larger than the expected number of likely specific numbers generated so that the probability of the birthday problem arising is reduced to what is judged to be a "low probability". The birthday collision risk is directly related to the number of digits used in the generation of the transcendental number. The greater the number of digits used in the generation of the approximation of a transcendental number and in the resulting bit stream, the lower the risk of a birthday collision for a given number of random samples. Accordingly, the risk of a birthday collision can be reduced by constructing each specific version of the PRNG to carry a sufficiently large number of digits such that the probability of a "birthday collision" (i.e., a repeated result) can be made to be acceptably low given the context in which the PRNG is being used. For example, if the total size of possible binary outcomes from a PRNG is $2^{384}$, then the total number of binary digits is 384. If a PRNG carries 384 binary digits, then the probability of at least one birthday collision reaching, say, $10^{-6}$, arises after approximately $8.9 \times 10^{54}$ separate sets of 384 bit length numbers have been generated (which is a number very materially less than the total range of $2^{384}$ different possibilities (i.e., approx. $3.9 \times 10^{115}$ different possibilities)).

With the described systems and methods, "almost all" of the numbers generated by the PRNG module 116 are samples of normal numbers in all bases (including base 2) and the various parameters used collectively contain a number of digits far exceeding the size of the output of the PRNG module 116.

Methods of Generating Pseudo Random Numbers

Figure 3:
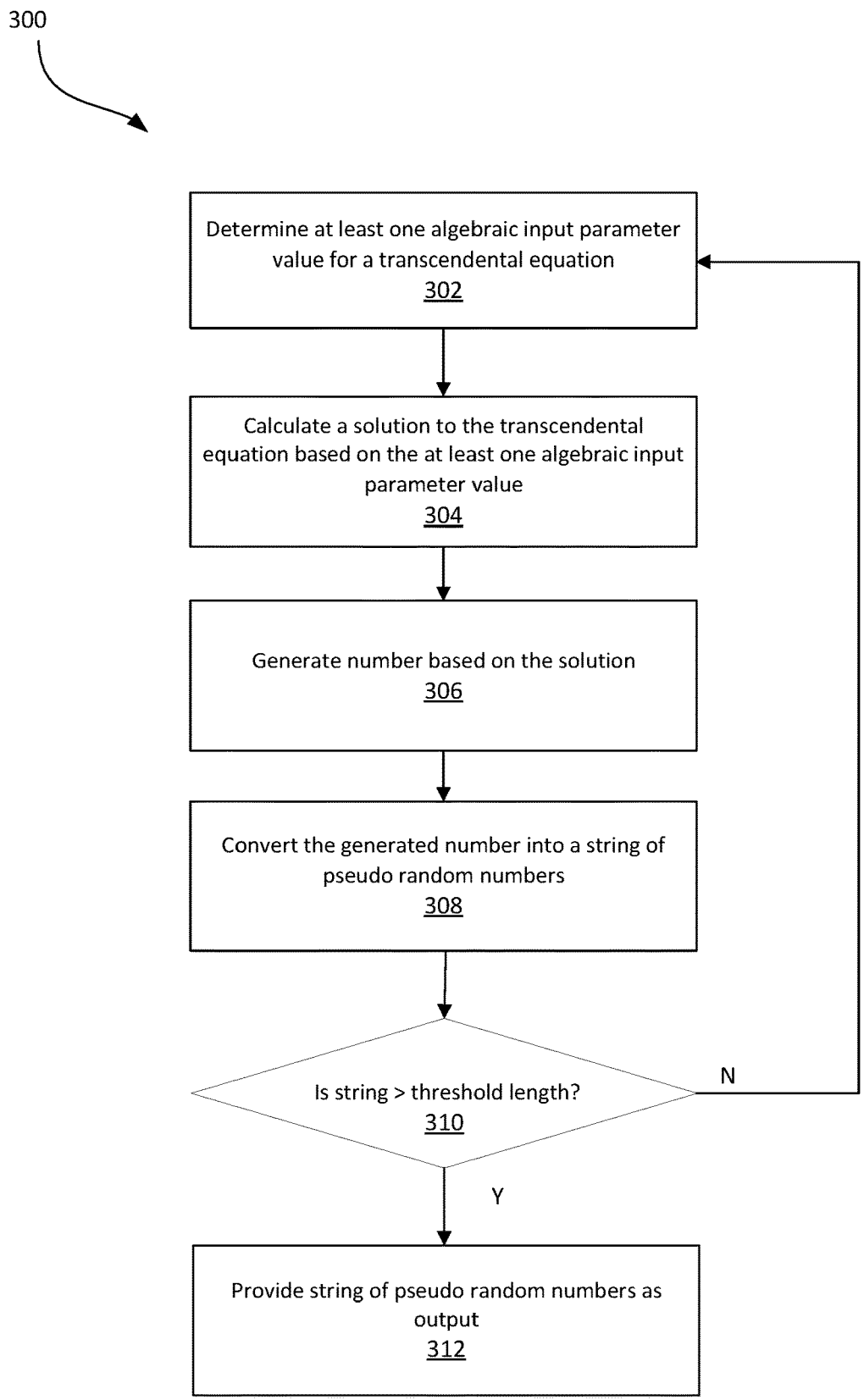
FIG. 3 depicts a process flow diagram of a computer-implemented method of generate pseudo random numbers, according to some embodiments.

Referring now to FIG. 3, there is shown a process flow diagram of a computer-implemented method 300 of generating pseudo random numbers, such as bits or binary strings, according to some embodiments. In some embodiments, the method is performed by the system 102 of FIG. 1. For example processor(s) 112 may execute instructions of the PRNG module 116 to cause the system 102 to perform the method 300.

At 302, the system 102 determines at least one algebraic input parameter value for a transcendental equation. In some embodiments, at least one algebraic input parameter value is determined from data received from a source of random noise, such as an external entropy source. In some embodiments, at least one algebraic input parameter value is selected or obtained from a pool or plurality of previously generated pseudo random digits or numbers, for example, as may be stored in a database, such as library 122. For example, the pool or plurality of previously generated pseudo random digits may be generated according some or all of the steps of method 300 of FIG. 3. In some embodiments, the at least one algebraic input parameter value for generating a pseudo random number value is selected from a pseudo random number value generated, for example, an immediately preceding iteration of method 300.

The transcendental equation comprises a transcendental function of the variable being solved for that is configured to or capable of generating transcendental number outputs from algebraic number inputs. In embodiments where the transcendental function of the transcendental equation is associated with an exceptional set that is countably finite (such as eqn 1), it may be possible to select the at least one input parameter values to ensure that the solution to the transcendental equation is a transcendental number. In some embodiments, the transcendental equation is the transcendental equation of eqn 1 and/or the transcendental equations for which eqn 2 and/or eqn 3 are the solutions as described above. Where eqn 1 is being used, the at least one algebraic input parameter values comprise values for the start point k, and parameters $\alpha$ and $\beta$ and that k<0 and $\alpha$ and $\beta$ are both >0. Where eqn 2 is being used, algebraic input parameter values are required for $\beta_0$, $\beta_1$, and $\alpha_1$ with the additional constraints that $\beta_0$ is not equal to 0 and that $\alpha_1$>0 (this last restriction is required where the systems and computer-implemented methods are unable to deal with complex numbers). Where eqn 3 is being used, algebraic input parameter values are required for $\beta_0 \ldots \beta_n$, and $\alpha_1 \ldots \alpha_n$ with the additional constraints that $\beta_0$ is not equal to 0 and that $\alpha_1 \ldots \alpha_n$ are all individually >0 (this last restriction is required where the systems and computer-implemented methods are unable to deal with complex numbers).

At 304, the system 102 calculates a solution to the transcendental equation based on the at least one algebraic input parameter value and at 306, generates a number based on the solution. In some embodiments, the generated number is an approximation of the solution to the transcendental equation, such as an approximation to a transcendental number.

For example, the system 102 may calculate a solution to the transcendental equation using any suitable root finding algorithmic method, such as a numerical method or an analytic formula approximation technique, such as those discussed above.

At 308, the system 102 may convert the generated number into a decimal value between 0 and 1 and/or a string and/or sequence of pseudo random numbers, for example, as bits (base 2), as decimals (base 10), or some other base. For example, system 102 may convert the generated number into a sequence of pseudo random numbers with bases other than 2 or 10.

In some embodiments, the system 102 converts the generated number, which may be an approximation to a transcendental number, into a decimal value between 0 and 1. This may be achieved by removing the negative sign from the generated number, if necessary, and multiplying the result by $10^n$ (where n is a positive integer the choice of which may depend on the particular application, for example, an integer >10) and removing the digits to the left of the decimal point to produce a decimal between 0 and 1. For example, where eqn 1 is being used, n may be selected as being a positive integer >10. Where eqn 2 or eqn 3 is being used, n may be selected as being a positive integer >20.

The system 102 may also convert the decimal value into a digit string or a binary string of pseudo random numbers. In some embodiments, the decimal may be broken into a digit string before being converted to the binary string, for example, as may be desirable for a particular end use application.

In some embodiments, converting the generated number into the binary string comprises assigning one of a zero or a one to each even digit of the decimal value and assigning the other of a zero or a one to each odd digit of the decimal value. In some embodiments, the method further comprises determining which one of a zero or a one to assign to each even digit and each odd digit of the decimal value by determining whether (i) the decimal value, or, alternatively, (ii) a decimal generated in a prior iteration, is greater than 0.5. In some embodiments, converting the decimal value into the binary string of pseudo random numbers by replacing each digit of the decimal value with the last bit of the equivalent ASCII character.

In other embodiments, converting the generated number into the binary string comprises conversion of the generated number into an integer based on the digits following the decimal point, determining an equivalent binary value of the integer; and determining the binary string of pseudo random bits as being the determined equivalent binary value of the integer. For example, this may involve restating the string of decimal digits as an n digit integer and then converting this integer into its equivalent binary format or having the decimal digits stated directly in their binary equivalent. In some embodiments, retention of the leading zero's may be desirable to preserve the normality property.

In some embodiments, the system 102 may generate the sequence or string of pseudo random numbers by performing steps 302 to 308 of method 300 to determine the generated numbers based on approximate solutions to the transcendental equation. In some embodiments, multiple iterations of steps 302 to 308, and in some cases 1,000 or 10,000 or some different number of iterations or re-use cycles, may be performed to generate a sequence of numbers. For example, the system 102 may convert the generated number into a decimal value between 0 and 1 and may use the decimal(s) generated at 308 as input parameter value(s) for the transcendental equation and the process may be repeated in this way multiple times. In some embodiments, the system 102 may only retain the most recent, for example, the last one or two sequences of decimals or an arbitrary number of decimals and convert them to a string of pseudo random numbers as an output. The decimals generated in the intervening steps may not be retained by the system 102, and for example, may be removed from the system 102 once they have been used.

In some embodiments, part of the outputs from the prior computational step are exclusively used for the next input parameter values in the next step to make backwards and forwards computation of the outputs more difficult by an individual or computer system with access only to the pseudo random number value output. For example, the system 102 may be configured to generate a first sequence of numbers (e.g., decimal numbers, binary numbers or numbers that are neither decimal numbers nor binary numbers) and a second sequence of numbers (e.g., decimal numbers, binary numbers or numbers that are neither decimal numbers nor binary numbers) wherein the pseudo random value output is selected from the first sequence of numbers and the input parameter value for calculating the subsequent pseudo random value is selected from the second sequence of numbers. In some embodiments, for example, the system 102 may be configured to generate a first sequence of numbers, and the pseudo random value output may be selected as a subset of numbers in the sequence of numbers, for example the last one number or the last two numbers, or any arbitrary number of numbers, in the sequence of numbers.

In some embodiments, at 310, the system 102 may determine whether or not the pseudo random number or sequence of pseudo random numbers is greater than a threshold length. For example, where the pseudo random numbers are in the form of binary strings, this may involve combining the binary string determined at 308 with previously generated binary strings. If the binary string is not greater than the threshold length, the system 102 may again perform the steps of 302 to 308 to generate a further binary string to be combined with the previously generated binary string. The threshold length may, for example, be dictated by the end use application. In some embodiments, different values for the input parameters for the transcendental equations are used compared to those used for the previous iteration. In some embodiments where eqn 1 is being used, the same starting point k value may be used. However, in some embodiments, for example, where the binary string is to be applied in a security oriented setting, a different k can also be used for each iteration.

If the pseudo random number or sequence of pseudo random numbers is greater than the threshold length, at 312, the system 102 provides the pseudo random numbers as an output. In some embodiments, the system 102 may be configured to select a subset of the digits of the pseudo random number(s) as the output. In other embodiments, the entirety of the pseudo random number or the sequence of pseudo random numbers is selected as the output.

In some embodiments, the system 102 provides the output to the application specific module(s) 120. In some embodiments, the system 102 is configured to transmit the output to one or more external or remote systems or devices, for example, via the communications network 104, or to save the output in library 122.

Key and Seed Generation on Devices Such as Low Power Constrained Internet of Things Devices As discussed above, a significant challenge impeding the development of the IoT is the issue of insufficient entropy or entropy starvation, particularly on low-power, constrained IoT devices with limited processing power and memory. For example, such IoT devices tend to have little or no entropy available from which suitably random seeds can be generated for its security software to function properly, especially at device start-up. The system 102, performing method 300, provides for the generation of pseudo random numbers which can be used as seeds with the necessary statistical properties on devices requiring an improved source of entropy, and may be particularly advantageous where there is little or no entropy available for the seeding of either a PRNG or CSPRNG, thereby addressing or mitigating the issue of entropy starvation.

Figure 4:
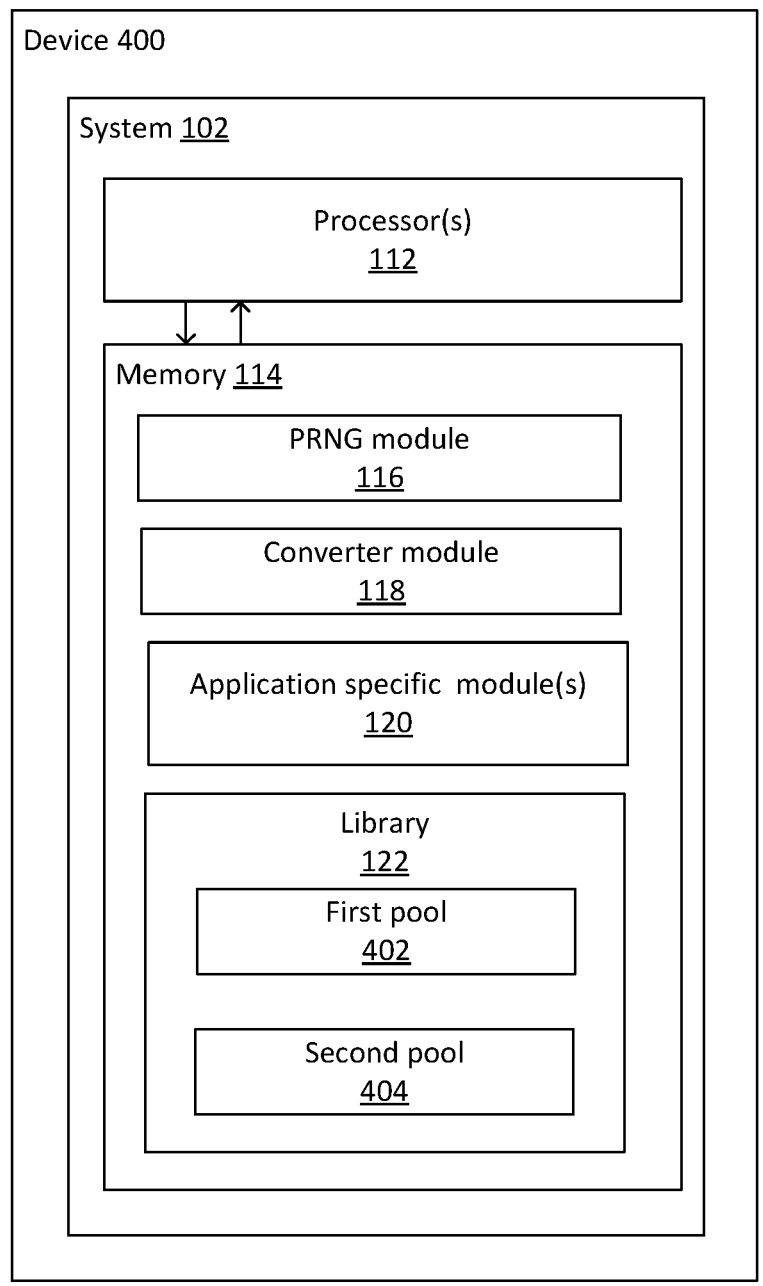
FIG. 4 is a block diagram of a device comprising the system of FIG. 1, according to some embodiments.

For example, and as illustrated in FIG. 4, the system 102, or the PRNG module 116 and/or the converter module 118 may be deployed on a device 400 such as an IoT device or on specific components of the device. Alternatively, the system 102 may comprise the device 400 and the application specific module(s) 120 may be configured to perform the functionality of the device using the output from the PRNG module 116 and/or the converter module 118.

Key and seed generation for VMs operating in the cloud is also of great importance for the integrity and security of those virtual machines. Virtual machines often lack access to suitably random seeds or have a relatively low level of available entropy available from which suitably random seeds could be constructed. Security problems associated with VM services operated from the cloud at data centres lacking sufficient entropy (especially at start-up), can be addressed or mitigated by including, within each VM instance, a dedicated version of the PRNG module 116 in a VM operating system.

Figure 6:
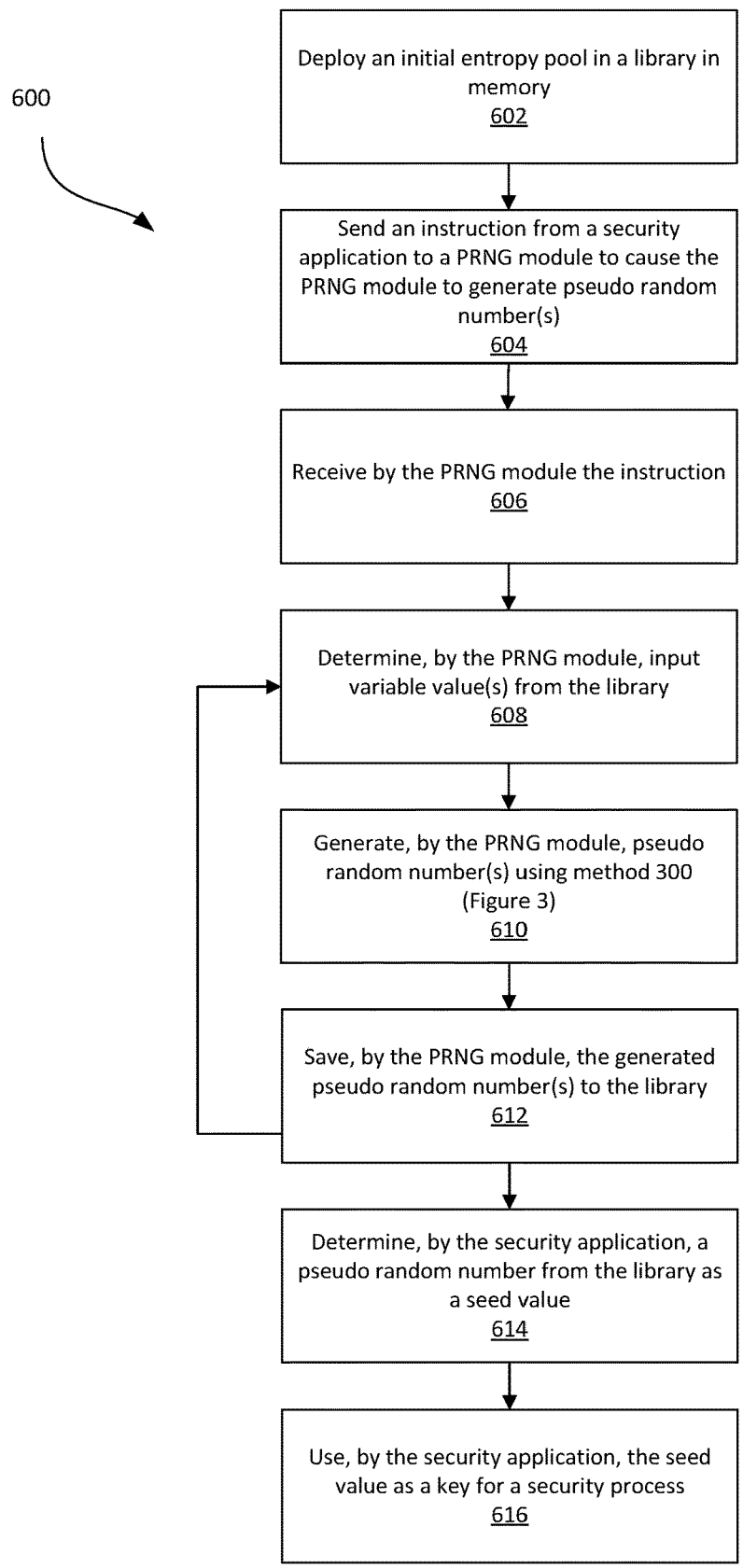
FIG. 6 is a process flow diagram of a computer-implemented method of generating a security key, according to some embodiments.

Referring to FIG. 6, there is depicted an example VM network system 500. The system 500 comprises one or more host computers 502, which may for example, be systems 102 of FIG. 1. In some embodiments, the system 100 of FIG. 1 corresponds with the VM network system 500, where like reference numerals denote like systems or components.

In this embodiment, each host computer 502 comprises or runs one or more VMs 504. The VMs 504 may each have guest operating systems (not shown) that may be different from one another. The host computer 502 may comprise a hypervisor (not shown) that emulates the underlying hardware platform for the VMs 504. The host computer(s) 502 are in communication with one or more devices 108, such as client devices across the communications network 104. The VMs 504 may be accessed by the devices 108 across the communications network to provide functionality to the devices 108. The host computer(s) 502 may also be in communication with one or more servers 106, which in some embodiments, may act as a host server. In some embodiments, one or more of the host computers 502 may act as the host server. The VMs 504 are managed by the host server. For example, the host server may be configured to add or delete VMs, balance the load on the VM network system 500 and/or monitor the operations of the VM network system 500. In some embodiments, a plurality of the host computers 502, and in some embodiments, the one or more servers 106 to form a VM data centre.

Figure 5:
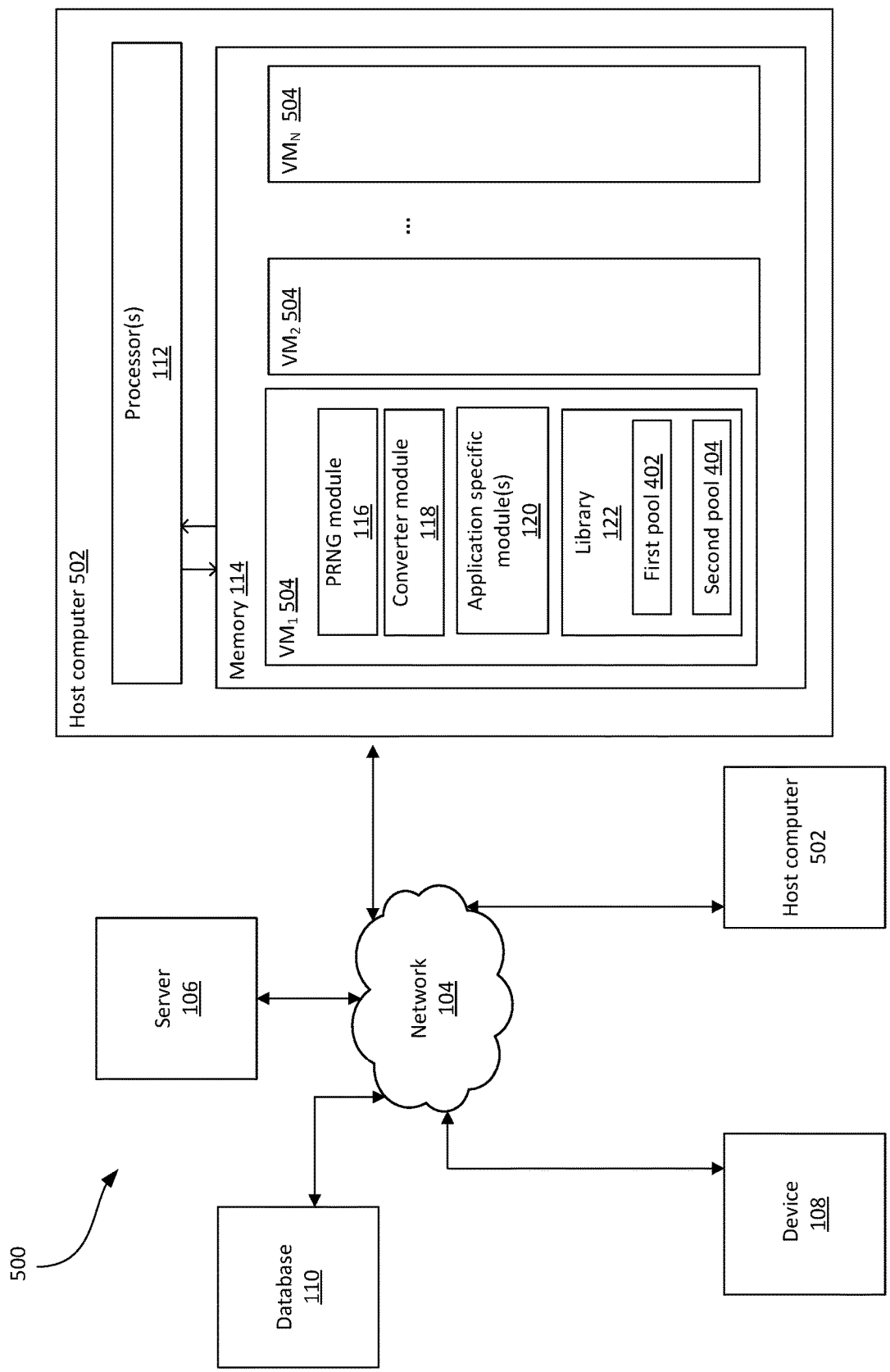
FIG. 5 is a block diagram of a VM network system according to some embodiments.

As illustrated in FIG. 5, each VM 504 comprises a PRNG module 116, and a library 122. Each VM 604 may further comprise a converter module 118, and/or the application specific module(s) 120. In some embodiments, the application specific module(s) 120 may be configured to perform or provide specific functionality to a device 108 or server 102 using the output from the PRNG module 116 and/or the converter module 118.

A host computer 502, performing method 300, provides for the generation of pseudo random numbers which can be used as seeds with the necessary statistical properties for VMs operating in the cloud requiring an improved source of randomness, and may be particularly advantageous where there is little or no entropy available for the seeding of either a PRNG or CSPRNG, thereby addressing or mitigating the issue of entropy starvation.

The application specific module(s) 120, which may for example, be an encryption device or data security application requiring a seed value as a key, may instigate operation of the PRNG module 116, for example, by transmitting a request for a key to the PRNG module 116. The PRNG module 116, and in some embodiments, the converter module 118, may be configured to generate pseudo random numbers, which may be stored in the library 122 and from which the required key may be selected. The PRNG module 116 may thereby replenish the library 122 every time the device 400, 108, server 106, or application specific module(s) 120 calls the PRNG module 116 into operation.

The library 122 may be prepopulated, for example, during manufacture, with pseudo random numbers or random numbers from a hardware entropy source to serve as an initial pool of suitably random parameters for the PRNG module 116 and randomness for the application specific module(s) 120. For example, the library 122 may include one or more pseudo random numbers from which a suitable at least one algebraic input parameter can be acquired or determined for the PRNG module 116. The initial pool of suitably random parameters may be unique to each and every device or component or VM. In the case of devices such as IoT devices, the initial pool of suitably random parameters may be generated during the manufacturing of device 400 or component process. In the case of the VM 504, upon creation of the VM 504, for example, by the host server, an initial pool of suitably random parameters, such as a block of bits, may be supplied to the VM 604, with each initial pool being specific or unique to a VM 504. For example, the VM network system 500 may comprise a central instance of a PRNG module 116, which may for example, be deployed on the host server, and which may be configured to supply the initial pool of suitably random parameters. In other embodiments, the initial pool may be received or captured by the VM 504 from a continuously operating secure dedicated TRNG at the VM network system 500. In some embodiments, the initial pool of suitably random parameters may be generated according to method 300 using the system 102, for example, where every instance of the pseudo random number generation is seeded itself from a suitable TRNG.

In some embodiments, the library 122 comprises a first sub-division or randomness pool 402 configured to store one or more pseudo random numbers from which a suitable at least one algebraic input parameter can be acquired or determined for the PRNG module 116. The library 122 comprises a second sub-division or randomness pool 404 configured to store one or more pseudo random numbers from which a suitable a seed value for use as a key may be acquired or determined. The first and second randomness pools 402, 404 may be distinct and separate from one another. The first and second randomness pools 402, 404 may each be unique. In some embodiments, the PRNG module 116 may replenish both the first and second randomness pools 402, 404 every time the device 102, 400, server 106, VM 504 or application specific module(s) 120 calls the PRNG module 116 into operation. In some embodiments, the PRNG module 116 of each VM 504 can access its own local first and second randomness pools 402, 404; in other words, separate and distinct first and second randomness pools 402, 404 may be deployed or provide for each VM 504.

Depending on the device or system design, the PRNG module 116 may also incorporate device generated entropy or hardware generated entropy from a secure dedicated TRNG at the centre (suitably processed to reduce or ideally remove any bias) as an additional source of entropy that can be added to the pool of parameters in the library 122 for the PRNG module 116.

Referring now to FIG. 6, there is shown a method 600 of generating a key on a device 400 such as an IoT device, or by a virtual machine 502.

At 602, an initial pool of one or more random numbers is deployed in library 122 of memory 114 of the device 400, or the virtual machine 604 of the host computer 602. In some embodiments, the initial pool may be generated during the manufacturing of device 400 according to method 300 or with random numbers generated from a hardware entropy source or in any suitable manner. In the case of VMs, the initial pool of parameters may be unique to each and every virtual machine and may, for example, be generated during the manufacturing of the software for each virtual machine.

For example, the system 102 may be configured to perform method 300 to generate pseudo random numbers, where every instance of the generation is seeded itself from a suitable TRNG. By providing securely separated and isolated randomness pools 402, 404 for each VM 504, high quality pseudo random numbers or bits may be readily or immediately available to the PRNG module 116 and/or the application specific module(s) of the VM 504 from every time a new VM 504 is started.

In some embodiments, the initial pool is stored or saved in library 122 and is configured to store random numbers for use as input parameters for the PRNG module 116. In some embodiments, the initial pool is split or divided between a first randomness pool 402 configured to store random numbers for use as input parameters for the PRNG module 116, and a second randomness pool 404 configured to store pseudo random numbers for use as seed values for keys for the application specific module(s) 120.

In some embodiments, where there is some entropy available to the device 400 or to the VM 604, this can be added (and in some embodiments, without the need for any post-processing) to the library 122, or the first randomness pool 402 of the library 122 and/or the second randomness pool 404 of the library 122.

At 604, the application specific module(s) 120 sends an instruction to the PRNG module 116 to cause the PRNG module 116 to generate a pseudo random number. In some embodiments, the application specific module(s) 120 may be instigated or activated by a user, for example, via a user interface (not shown) deployed on the device 400 or via a request or demand received over the network 104 from another device 108 or server 106, and in response to the instigation or activation, transmits the instruction to the PRNG module 116.

At 606, the PRNG module 116 receives the instruction from the application specific module(s) 120.

At 608, the PRNG module 116 retrieves or determines one or more input parameter values from the library 122, and in some embodiments, from the first randomness pool 402.

At 610, the PRNG module 116 performs steps 302 to 308 of method 300 to generate a pseudo random number. In some embodiments, device 400 or VM 604 further comprises the converter module 118 which is configured to cooperate with the PRNG module 116 to perform one or more of steps 308 to 312.

At 612, the PRNG module 116 saves the generated pseudo random number in library 122. In some embodiments, the PRNG module 116 saves the generated pseudo random number in the first randomness pool 402 or the second randomness pool 404.

In some embodiments, the PRNG module 116 is configured to split or divide the generated output stream of the pseudo random number into a first output stream and a second output stream. The PRNG module 116 stores the first output stream in the first entropy pool 402 and the second output stream in the second entropy pool 404. For example, the system 102 may be configured to generate a first sequence of numbers e.g., decimal numbers, binary numbers or numbers that are neither decimal numbers nor binary numbers) and a second sequence of numbers (e.g., decimal numbers, binary numbers or numbers that are neither decimal numbers nor binary numbers), wherein a pseudo random value output to be used as a seed value is selected from the first sequence of numbers and the input parameter value for calculating the subsequent pseudo random value is selected from the second sequence of numbers.

In some embodiments, as the PRNG module 116 saves the newly generated pseudo random number(s) in the library 122, first and/or second randomness pools 402, 404, it overwrites previously stored pseudo random number(s). In some embodiments, the PRNG module 116 deletes generated pseudo random number(s) as soon as they are used.

In some embodiments, once activated, the PRNG module 116 operates iteratively or continuously until the device 400 is powered off. In other embodiments, once activated, the PRNG module 116 operates iteratively or continuously. For example, once the PRNG module 116 saves the generated pseudo random number(s) in library 122 (or in the first and/or second randomness pools 402, 404) at step 612, it reverts to step 608, where it determines the next input parameter(s) from the library 122 (or from the first randomness pool 402) and then to step 610 to generate a further pseudo random number. Accordingly, the PRNG module 116 operates iteratively, retrieving input parameters from the library 122 or the first randomness pool 402, generating pseudo random number(s) and saving them in the library 122 or the first and/or second randomness pools 402, 404.

By providing two securely separated and isolated randomness pools (the first randomness pool 402, and the second randomness pool 404), high quality pseudo random numbers (which may be in the form of decimal numbers, binary numbers or numbers that are neither decimal numbers nor binary numbers) may be immediately available to the application specific module(s) 120 (for example, device security software) and the PRNG module 116 from every time the device starts up, and the random number supplied to the application specific module(s) 120 may provide no insight into the internal state of the PRNG module 116. Further, by splitting the output of the PRNG module 116 as outlined above, the complete output does not go to either of the first or the second randomness pools, which may further mitigate against the seed values being supplied to the application specific module(s) 120 providing insight into the internal state of the PRNG module 116.

At 614, the application specific module 120 determines a seed value from the library 122, or in some embodiments, from the second randomness pool 404. In some embodiments, the library 122 and/or second randomness pool 404 are prepopulated with one or more pseudo random numbers (or, at the point of manufacture, with pseudo random numbers or random numbers from a hardware entropy source) and step 504 to 512 are configured to replenish the library and/or first and second randomness pools 402, 404. Accordingly, step 514 may occur in response to the instigation or activation of the application specific module(s) 120. For example, step 514 may occur before, concurrently or after step 504.

At 616, the application specific module(s) 120 uses the seed value as a key for a data security application, such as an encryption process. For example, the application specific module(s) 120 may use the seed value as a key for encrypting data to be transmitted across the network 104. Further examples of specific data security applications are discussed below with reference to FIGS. 7 and 8.

By deploying or installing the PRNG module 116, and in some embodiments, the converter module 118, on the device 400 at the point of manufacture, or on creation of the VMs 504, and in some embodiments, providing two distinct randomness pools, the first randomness pool 402 and the second randomness pool 404, sufficient randomness is provided to the device 404 or the VM 504, thereby providing a sufficient source of randomness to the device 400 or VM 504, and alleviating any issues with entropy starvation.

Furthermore, the high quality statistical properties of the pseudo random numbers from which the input parameter value(s) and the seed values are derived are an artefact of the PRNG module 116 producing pseudo random numbers that are based upon samples taken from, in almost all cases, normal numbers derived from the solution to transcendental equations.

In some embodiments, the splitting of the output of the PRNG module 116 as outlined above ensures that a first section of the output is provided to the first randomness pool 402 operating on the VM 504 only, and a second separate section of the output is provided to the second randomness pool 404, from where the application specific module(s) 120 such as the device or VM's security software (and other applications requiring random bits) acquires seed and keys may give no insight into the internal state of the PRNG module 116. Where supported, the PRNG module 116 and the initial randomness pools could be installed on an existing VM 504 via a software update. The pseudo random numbers produced by the PRNG module 116 are theoretically and empirically verified uniform outputs. As explained above, numbers generated according to the described methods tend to have excellent statistical properties. The excellent statistical uniformity of the outputs (e.g., decimal numbers, binary numbers or numbers that are neither decimal numbers nor binary numbers) is due to the theoretical statistical properties of the outputs (e.g., decimal numbers, binary numbers or numbers that are neither decimal numbers nor binary numbers) produced; they are samples from normal numbers in almost all instances. The results of extensive statistical testing are consistent with the theoretical basis of the described PRNG module 116 (refer the following section for details on testing). In contrast, it is noted that most PRNGs in widespread use are ad hoc designs and formal mathematical proof regarding the statistical properties of the output is often limited or lacking. Even though some properties related to security (e.g., the size of the state space, expected or actual cycle length or the probability of a collision) can be measured, verification of the statistical properties of most PRNGs is essentially an empirical undertaking. Accordingly, there is an uncertainty whether or not a particular PRNGs or hash function's statistical behaviour is fully understood when a mathematical proof is incomplete or lacking.

In some embodiments, collision risk can be made arbitrarily small. For example, the number of digits used in the parameter input(s) and the decimal stream or bit stream output(s) may be arbitrarily enlarged by increasing the floating point precision of the calculations carried out by the PRNG module 116 which, in turn, means that the birthday collision probabilities (a characteristic of all PRNGs) can be made arbitrarily small thereby making the state space correspondingly larger.

Devices or VMs configured to operate in accordance with the method 600 of FIG. 6 mitigate reverse engineering and brute force attacks. For example, predicting future outputs based on the bits already produced by the PRNG module 116 may be limited to brute force attacks since the output bits are likely to be statistically indistinguishable from a random source of bits. For example, in some embodiments, the outputs of the PRNG module 116 used by the security application (as seeds or keys) are sourced from a separate randomness pool to that of the outputs used as input parameters values by the PRNG module 116. Similarly, and as described in some embodiments, truncating and discarding of an arbitrary number of leading digits from the approximate transcendental numbers generated in each step may also limit reverse engineering the prior parameter inputs based on previous outputs to brute force attacks. Further, increasing the number of digits computed for each approximate transcendental number, as described in some embodiments, is likely to make the reverse engineering of the outputs based on brute force attacks correspondingly more difficult.

In some embodiments, outputs from the PRNG module 116 are substantially unpredictable. The statistical properties of the output bit stream are likely to make it substantially indistinguishable from a sequence of random bits and, coupled with the splitting of the outputs, as described in some embodiments, substantially unpredictable. The PRNG module 116 may be seeded from a dedicated randomness pool, for example, the first randomness pool 402, from first start and in some embodiments, can run iteratively or continuously for extended periods of time without the need for reseeding as noted below.

Furthermore, the described embodiments provide for a relatively simple, low computational overhead device with improved source of randomness, which can be particularly advantageous for addressing the issue of entropy starvation on devices 400, such as IoT devices or VMs. The simplicity of the PRNG module 116 means that the output is produced directly without requiring separate de-biasing and conditioning steps to be performed.

The described embodiments provide for a relatively lightweight solution, and, as such, is suitable for low-power, constrained IoT devices. The PRNG module 116 can operate on a lightweight chip which, may be, for example, a device capable of running SSL encryption, typically in the order of 200+ MHz.

Securing Data at Rest and in Motion—Example

The described systems and methods may be used for securing data at rest and in motion. For example, the described embodiments may be suitable for use as an encryption protocol such as a stand-alone stream cipher or for use in conjunction with other existing CSPRNGs and PRNGs and data transmission/communications protocols. The described PRNG module 116 and its application to security processes is particularly advantageous for applications where the security strength of the stream cipher is the primary consideration due to the excellent statistical properties of the bit stream output of the PRNG module 116 (which is confirmed by both theoretical and empirical analysis), as discussed above; the quality and performance characteristics of a stream cipher tend to depend fundamentally on the statistical properties of the key and the PRNG module 116 bit stream output associated with it.

Outputs generated according to method 300 of FIG. 3 may be used as the basis of a stream cipher where the bits of a plain text stream are combined each bit at a time with the PRNG module 116 output bit stream (i.e., the key stream) to produce an encrypted bit stream; an example of a suitable combining operation is the exclusive-or operation (a bitwise exclusive-or operation carried out on pairs of bits would, in this particular case, involve comparing each pair of bits (comprising the corresponding bits from the keystream and the plain text) and assigning a 1 to the corresponding bit in the encrypted output bit stream if the two bits are the same and a 0 if they are different).

In some embodiments, an initial seed of the bit stream output from the PRNG module 116 (i.e., the initial input parameters) may correspond to an encryption key of the stream cipher based on the PRNG module 116. Multiple iterations of the method 300 of FIG. 3 can be run to ensure that the bit stream output speed is sufficient for the specific usage case for the stream cipher and the computational resources available.

The process of decrypting the combined (i.e., encrypted) bit stream involves regenerating the original keystream using the key with the PRNG module 116 and combining it bit by bit with the encrypted bit stream to recover the plain text bits.

The PRNG module 116 of the described embodiments is an effective and practical solution for use as the basis of a stream cipher due to its well understood theoretical properties and excellent empirical statistical performance. In terms of operation, once the key (i.e., the initial seed) is generated, it serves as an initial set of input parameters for the operation of the PRNG module 116. When used as a stream cipher, the PRNG module 116 may be configured to operate such that its output is split into two streams; the first output stream may provide further input parameters for the continuing operation of PRNG module 116 computations while the second output stream may provide a bit stream used for the encryption process itself. This approach makes it difficult for an internal state of the PRNG module 116 to be derived directly from the output bit stream used for the encryption process.

Given secure transmission of the key through a suitable key distribution regime (such as a Diffie-Hellman key exchange protocol), a decryption process involves regeneration of the original PRNG output bit stream to decrypt the encrypted bit stream and recover the original plain text bit stream.

Figure 7:
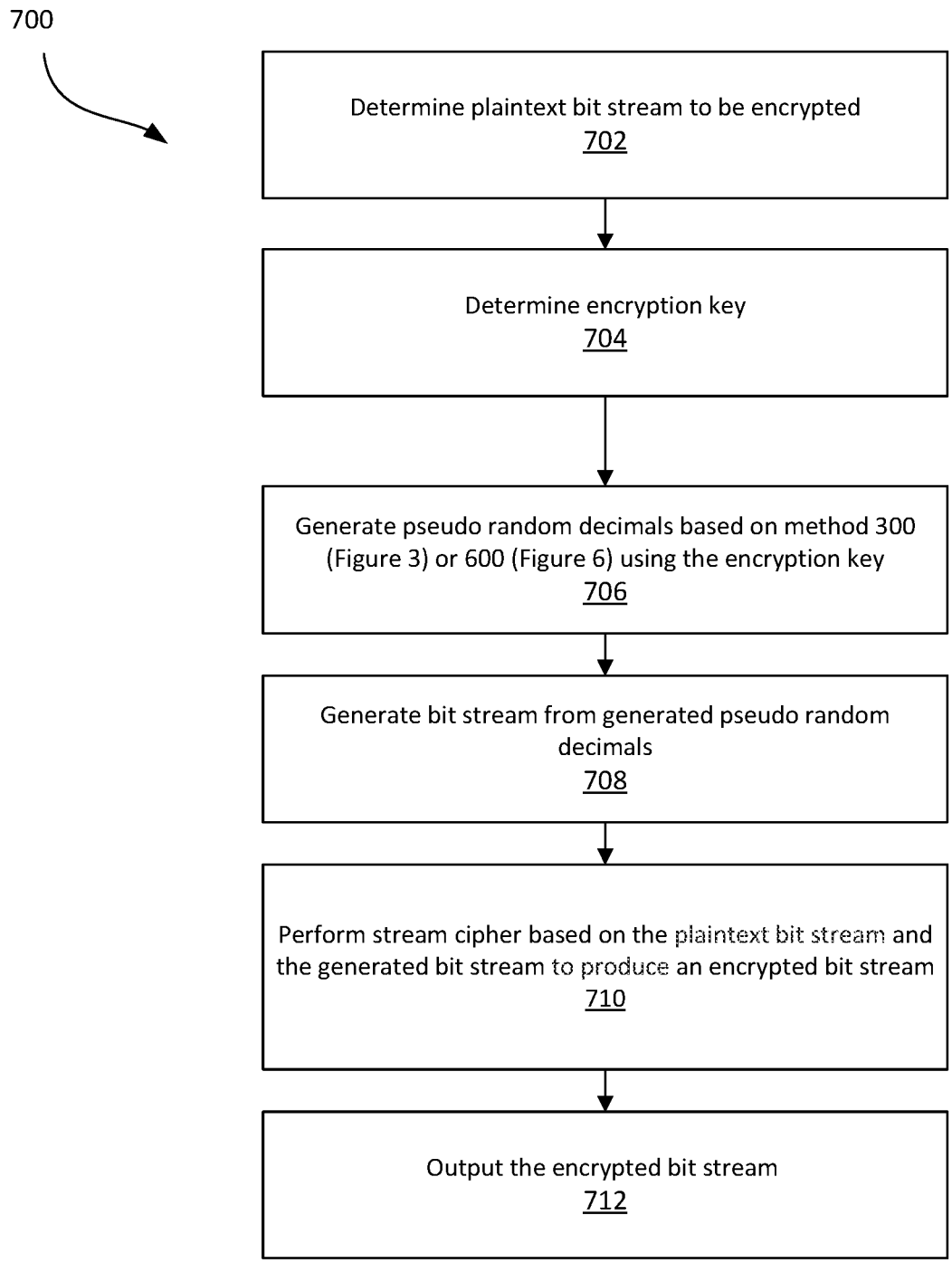
FIG. 7 is a process flow diagram of a computer-implemented method of encryption, according to some embodiments.

Referring to FIG. 7, there is illustrated a process flow diagram of a computer-implemented method 700 of encryption, according to some embodiments. For example, the method 700 may be implemented by system or device 102, 400, 602 whereby the application specific module(s) 120 is/are configured to cooperate with the PRNG module 116 and in some embodiments, the converter module 118 to perform the method 700.

At 702, the system 102, device 400, or the application specific module(s) 120 determines data to be encrypted, wherein the data comprises plaintext converted into bits.

At 704, an encryption key for use as an initial algebraic input parameter value for the PRNG module 116 is determined. The algebraic input parameters may be generated from a public/private key generation mechanism (or like key generation protocol) and form the key for the encryption method 700 (encryption key) by being used as the initial algebraic input parameter values in method 300.

Furthermore, in some embodiments the key for the stream cipher may be distributed using a Diffie-Hellman or like key distribution mechanism.

At 706, the system 102, device 400, or the PRNG module 116 generates a set of pseudo random numbers (e.g., decimal numbers, binary numbers or numbers that are neither decimal numbers nor binary numbers) based on method 300 or method 600 or steps thereof, using the encryption key (the encryption key is also used as the decryption key below).

In some embodiments, the method 300, 600, or at least steps thereof, are performed iteratively to generate the set of pseudo random numbers, with outputs or part outputs generated by the PRNG module 116 being used as input parameter values for a next iteration of the pseudo random numbers generation.

At 706, in some embodiments, the set of pseudo random numbers generated may be split into two sets of pseudo random numbers with the first set stored in a pool or plurality of previously generated pseudo random digits stored in a database, such as library 122 for use only by method 300 and the second set of pseudo random numbers being converted to a bit stream set at 706. In some embodiments, the first set may be stored in the first randomness pool 402, and the second set may be stored in the second randomness pool 404.

At 708, the set of pseudo random numbers is converted into a bit stream set, for example, by converter module 118.

At 710, the system 102, device 400, or the application specific module(s) 120 performs a stream cipher operation based on the plaintext bit stream and the bit stream set generated by the system 102 to produce an encrypted bit stream. For example, in the stream cipher operation each plaintext bit may be encrypted or combined with a respective pseudo random bit to produce a respective digit of the encrypted bit stream. In some embodiments, the combining operation is exclusive-or (XOR).

At 712, the system 102, device 400, or the application specific module(s) 120 outputs the encrypted bit stream. In some embodiments, the encrypted bit stream is transmitted to a remote system, device or database across the communications network 104. In some embodiments, the encrypted bit stream is stored on a local system, device or database across the communications network.

In some embodiments, the system 102, device 400, the application specific module(s) 120, or a system or device to which the encrypted bit stream has been transmitted and/or stored, or a related system, may be configured to decrypt the encrypted bit stream. In some embodiments, such decryption comprises determining the encrypted bit stream to be decrypted and applying method 700 to reproduce the original bit stream using the same keys which have been retained on the local system or transmitted via communications network 104. For example, each encrypted bit may be decrypted or combined with the original respective pseudo random bit reproduced using the keys to produce a respective digit of the decrypted bit stream. In some embodiments, the combining operation is exclusive-or (XOR).

Figure 8:
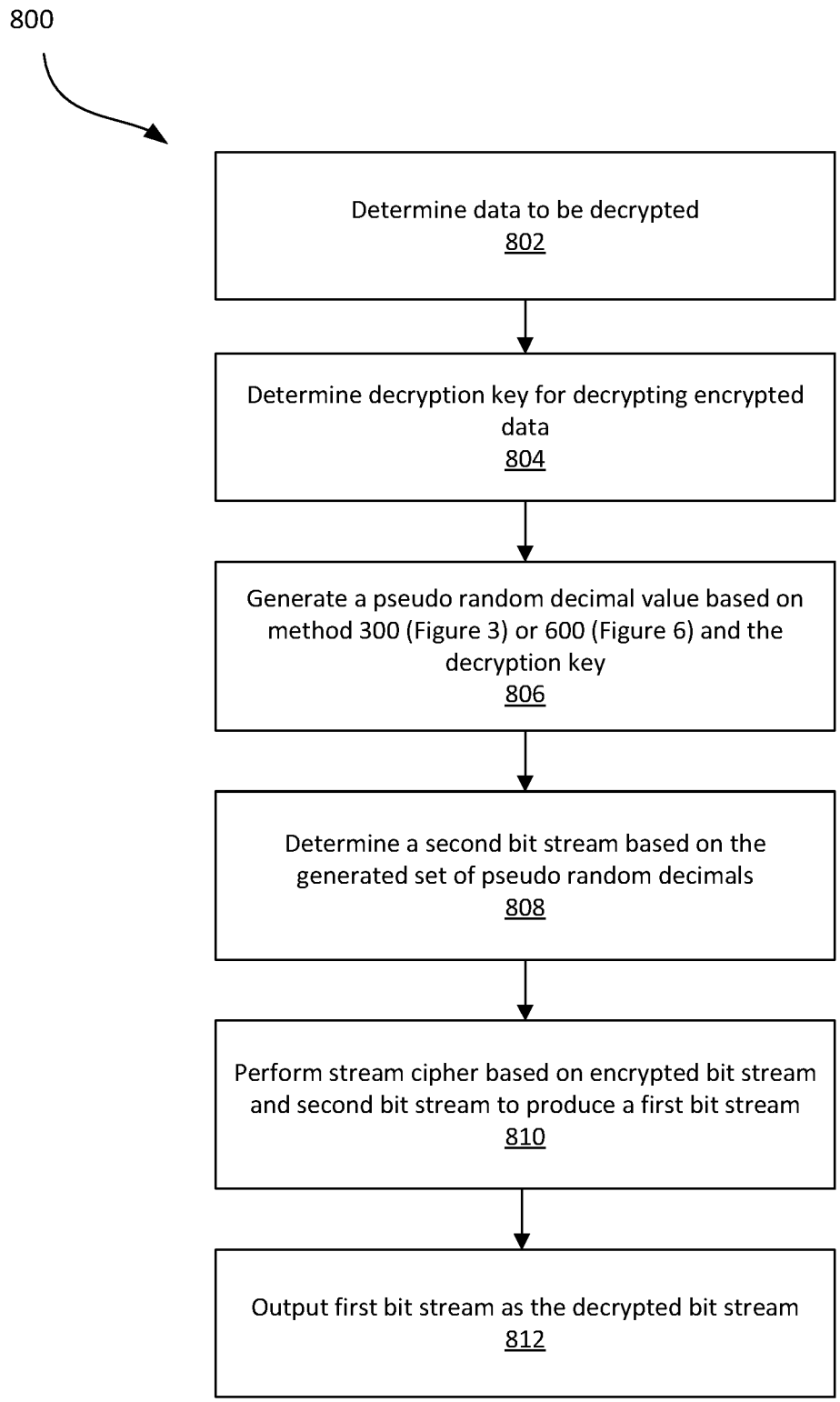
FIG. 8 is a process flow diagram of a computer-implemented method of decryption, according to some embodiments.

Referring to FIG. 8, there is illustrated a process flow diagram of a computer-implemented method 800 of decryption, according to some embodiments. For example, the method 800 may be implemented by system 102 or device 400 whereby the application specific module(s) 120 is/are configured to cooperate with the PRNG module 116 and in some embodiments, the converter module 118 to perform the method 800.

At 802, the system 102, device 400, or the application specific module(s) 120 determines encrypted data or bit stream to be decrypted. For example, the encrypted bit stream may be received from a remotely located system over a communications network. In some embodiments, this data may be the encrypted bit stream output of process 700.

At 804, the system 102 determines a decryption key for decrypting the encrypted bit stream. The decryption key may comprise at least one algebraic input value used to generate a bit stream used for encrypting the encrypted bit stream data.

At 806, the system 102, device 400, or PRNG module 116 generates a set of pseudo random numbers e.g., decimal numbers, binary numbers or numbers that are neither decimal numbers nor binary numbers) based on method 300 or method 600, or steps thereof, using the decryption key as the initial algebraic input parameter values. In some embodiments, the method 300, 600, or at least steps thereof, are performed iteratively to generate the pseudo random number(s), with outputs or part outputs generated by the PRNG module 116 being used as input parameter values for a next iteration of the pseudo random numbers generation.

At 808, the system 102, device 400, or converter module 118 converts the pseudo random numbers into a second bit stream.

At 810, the system 102, device 400, or the application specific module(s) 120 performs a stream cipher operation based on the encrypted bit stream and the second bit stream to produce the plaintext bit stream, which comprises the decrypted data.

At 812, the system 102, device 400, or the application specific module(s) 120 outputs the decrypted data.

Statistical Testing Performance

In terms of the statistical properties of the outputs produced according to the methods 300 and/or 600 and/or 700 and/or 800, collision resistance and resistance to reverse engineering the PRNG module 116 performs extremely well. The PRNG module 116 can produce extremely long sequences of statistically high quality bits and can do so from a single starting seed or from parallel instances of the PRNG module 116 from distinct starting seeds.

The PRNG module 116 (coded in C) passed the PractRand test package in a single test at 32 terabytes (the default ceiling for the PractRand test package) completed in June 2020 based on a single starting seed. The PRNG module 116 (coded in C) passed the PractRand test package in two separate tests at 256 terabytes (one completed in June 2020 and the other completed in August 2020) based on 10 parallel instances with distinct starting seeds. If the PRNG module 116 running as a single thread were to produce 32,768 random bits every second (16,384 being sent to each randomness pool every second), it would take over 270 years to reach an aggregate 32 terabytes of output—which is likely to be far in excess of the underlying device life.

In terms of empirical tests of PRNGs, PractRand is currently the leading statistical test package available—it detects the greatest number of deficiencies in the greatest number of RNG's compared to other generally available test packages and, unlike its competitors, has no upper limit on the amount of data it can analyse.

The PRNG module 116 is difficult to reverse engineer based solely upon the bit stream outputs. The statistical behaviour of the bit stream output reflects the facts that: (i) the bits produced in almost all the step are samples from distinct normal numbers; (ii) there are a number of leading digits that are discarded in each step; and (iii) the generation of separate output bit streams for the input parameter pool and the random seed pool of the PRNG module 116. Increasing the number of leading digits discarded increases the resistance to both reverse engineering and brute force attacks correspondingly.

Collectively, the test results confirm that the PRNG module 116 operating according to the described embodiments provides an excellent solution to the problem insufficient entropy, particularly on low-power, constrained IoT devices, or on VM's operating in the cloud. The device 400 comprising the PRNG module 116 requires no additional hardware on the device for the PRNG module 116 to operate effectively, and to produce sufficient bits for security software seeding purposes that may be indistinguishable from a true source of randomness.

Combined Applications

It will be appreciated that the described embodiments may be combined with other PRNG systems and may operate in multiple functions in the production of statistically high quality entropy seeds for other PRNGs and may serve as a CSPRNG in its own right based on statistically high quality entropy seeds.

It will be appreciated that the described embodiments may be configured such that multiple separate embodiments with distinct initial parameters operate in parallel to improve the overall speed of production of numbers and/or bits depending on the specific application.

Certain steps in the processes or process flows described in this disclosure naturally precede others for the embodiments to function as described. However, embodiments are not limited to the order of the steps described if such order or sequence does not alter the functionality of the described embodiments. That is, it is recognized that some steps may performed before, after, or parallel (substantially simultaneously with) other steps without departing from the scope and spirit of the present disclosure. In some instances, certain steps may be omitted or not performed. Further, words such as "thereafter", "then", "next", etc. are not intended to limit the order of the steps. These words are simply used to guide the reader through the description of the exemplary method.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:
1. A computer implemented method comprising:
a) receiving, by a pseudo random number generator module of a device, an instruction to generate pseudo random numbers from a security application;
b) determining, by the pseudo random number generator module, at least one algebraic input parameter value for a transcendental equation from a randomness library in memory of the device, wherein the transcendental equation comprises a transcendental function that is capable of generating transcendental number outputs from algebraic number inputs;
c) calculating, by the pseudo random number generator module, a solution to the transcendental equation based on the at least one algebraic input parameter value;
d) determining, by the pseudo random number generator module, one or more pseudo random numbers based on the solution; and
e) storing, by the pseudo random number generator module, the one or more pseudo random numbers in a randomness library for use as seeds for keys by the security application and as subsequent input parameter values for the pseudo random number generator module.

2. The method of claim 1 further comprising deploying in the randomness library, an initial randomness pool of one or more pseudo random numbers or random numbers from a hardware entropy source.

3. The method of claim 1, wherein the randomness library comprises a first randomness pool and a second randomness pool distinct from the first randomness pool, and the method comprising:
determining, by the pseudo random number generator module, the at least one algebraic input parameter value for the transcendental equation from the first randomness pool at initiation of the pseudo random number generator module;
determining, by the pseudo random number generator module, a first stream of pseudo random numbers and a second stream of pseudo random numbers from the one or more pseudo random numbers derived from the solution; and
wherein storing, by the pseudo random number generator module, the one or more pseudo random numbers in the randomness library comprises storing the first stream of pseudo random numbers in the first randomness pool and the second stream of pseudo random numbers in the second randomness pool.

4. The method of claim 3, further comprising:
retrieving, by the security application, a seed value based on a random number selected from the randomness library; and
using, by the security application, the seed value as a key for a security process.

5. The method of claim 4, wherein retrieving, by the security application, the seed value comprises selecting the random number from the second randomness pool.

6. The method of claim 2, wherein determining, by the pseudo random number generator module, the at least one algebraic input parameter value for the transcendental equation from the randomness library comprises selecting the at least one algebraic input parameter from the first randomness pool.

7. The method of claim 1, wherein calculating the solution to the transcendental equation comprises generating a first sequence of pseudo random numbers, wherein the pseudo random number output is selected as a subset of pseudo random numbers in the sequence of pseudo random numbers.

8. The method of claim 1, wherein calculating the solution to the transcendental equation comprises generating a first sequence of pseudo random numbers and a second sequence of pseudo random numbers, wherein the one or more pseudo random numbers are selected from the first sequence of pseudo random numbers and stored in the randomness library for use as seed values for the security application and the at least one input parameter value for calculating subsequent one or more pseudo random numbers is selected from the second sequence of pseudo random numbers.

9. The method of claim 1, wherein storing, by the pseudo random number generator module, the one or more pseudo random numbers in the randomness library comprises overwriting respective previously stored one or more pseudo random numbers.

10. The method of claim 1, comprising:
iteratively performing, by the pseudo random number generator module, steps c) and d) for a predetermined period, whereby the at least one input parameter for each iteration is derived from the one or more pseudo random numbers determined in the previous iteration.

11. The method of claim 1, wherein determining the at least one algebraic input parameter value comprises:
selecting the at least one algebraic input parameter value from a set of algebraic numbers, each of which when provided as an input to the transcendental function cause the transcendental function to output a transcendental number.

12. The method of claim 1, wherein the transcendental function is associated with an exceptional set, and wherein the transcendental function will produce a transcendental number for all algebraic input values that do not belong to the exceptional set, and an algebraic number for all algebraic input parameter values that do belong to the exceptional set.

13. The method of claim 1, wherein generating the pseudo random numbers comprises:
converting the solution into a pseudo random number; and
converting the pseudo random number into a binary string of pseudo random numbers.

14. The method of claim 13, wherein generating the binary string of pseudo random numbers comprises:
determining an integer from the decimal value by removing the leading zero and the decimal point;
determining an equivalent binary value of the integer value; and
determining the binary string of pseudo random numbers as being the determined equivalent binary value where leading zeroes are retained.

15. The method of claim 1, further comprising:
determining that a length of a string of the pseudo random numbers is less than a threshold length;
performing steps b) to c) to generate further pseudo random numbers; and
combining the pseudo random numbers and the further pseudo random numbers to create a combined string of pseudo random numbers.

16. The method of claim 1, wherein the transcendental equation is:

$$e^{-\beta\lambda^2} = -\alpha\lambda Erfc(\lambda)$$

$$\text{where } Erfc(\lambda) = 1 - (2/\sqrt{\pi})\sum_{n=0}^{\infty}[(-1)^n\lambda^{2n+1}]/[(2n+1)(n!)]$$

$$\text{where } e^{-\beta\lambda^2} = \sum_{n=0}^{\infty}(-\beta\lambda^2)^n/n!$$

where $\lambda$ is the solution;
$\alpha$ is a first of the at least one algebraic input parameter value and $\beta$ is a second of the at least one algebraic input parameter value; and
wherein $\alpha$ and $\beta$ [] are real algebraic numbers.

17. The method of claim 1, wherein the transcendental equation is $e^{\beta_0}\alpha_1^{\beta_1} \ldots \alpha_n^{\beta_n}=\exp(\lambda)$ with the following analytic solution:

$$\beta_0+\beta_1\cdot\ln(\alpha_1) \ldots \beta_n\cdot\ln(\alpha_n)=\lambda$$

where $\lambda$ is the transcendental number, $\beta_0$ is a non-zero algebraic number, $\beta_1 \ldots \beta_n$ are algebraic numbers, $\alpha_1 \ldots \alpha_n$ are non-zero algebraic numbers, and n is an integer and is $\geq 1$; and
wherein the at least one algebraic input parameter value comprises $\beta_0, \beta_1 \ldots \beta_n$, and $\alpha_1 \ldots \alpha_n$.

18. The method of claim 1, wherein the transcendental equation is $e^{\beta_0}\alpha_1^{\beta_1}=\exp(\lambda)$ with the following analytic solution:

$$\beta_0+\beta_1\cdot\ln(\alpha_1)=\lambda$$

where $\lambda$ is the solution, $\beta_0$ is a non-zero algebraic number, $\beta_1$ is an algebraic number and $\alpha_1$ is a non-zero algebraic number; and
wherein the at least one algebraic input parameter value comprises $\beta_0, \beta_1$ and $\alpha_1$.

19. A non-transitory machine-readable medium storing instructions which, when executed by one or more processors, cause an electronic apparatus to perform operations including:
a) receiving, by a pseudo random number generator module, an instruction to generate pseudo random numbers from a security application;
b) determining, by the pseudo random number generator module, at least one algebraic input parameter value for a transcendental equation from a randomness library in memory of the electronic apparatus, wherein the transcendental equation comprises a transcendental function that is capable of generating transcendental number outputs from algebraic number inputs;
c) calculating, by the pseudo random number generator module, a solution to the transcendental equation based on the at least one algebraic input parameter value;
d) determining, by the pseudo random number generator module, one or more pseudo random numbers based on the solution; and
e) storing, by the pseudo random number generator module, the one or more pseudo random numbers in a randomness library for use as seeds for keys by the security application and as subsequent input parameter values for the pseudo random number generator module.

20. A device comprising:
one or more processors; and
memory comprising non-transitory machine-readable instructions which, when executed by the one or more processors, causes the device to perform:
a) receiving, by a pseudo random number generator module of the device, an instruction to generate pseudo random numbers from a security application;
b) determine, by the pseudo random number generator module, at least one algebraic input parameter value for a transcendental equation from a randomness library in memory of the device, wherein the transcendental equation comprises a transcendental function that is capable of generating transcendental number outputs from algebraic number inputs;
c) calculate, by the pseudo random number generator module, a solution to the transcendental equation based on the at least one algebraic input parameter value;
d) determine, by the pseudo random number generator module, one or more pseudo random numbers based on the solution; and
e) store, by the pseudo random number generator module, the one or more pseudo random numbers in a randomness library for use as seeds for keys by the security application and as subsequent input parameter values for the pseudo random number generator module.

21. A host computer comprising:
one or more processors;
memory comprising a non-transitory machine-readable instructions; and
one or more virtual machines, each virtual machine being configured to perform:
   a) receiving, by a pseudo random number generator module of the host computer, an instruction to generate pseudo random numbers from a security application;
   b) determine, by the pseudo random number generator module, at least one algebraic input parameter value for a transcendental equation from a randomness library in memory of the host computer, wherein the transcendental equation comprises a transcendental function that is capable of generating transcendental number outputs from algebraic number inputs;
   c) calculate, by the pseudo random number generator module, a solution to the transcendental equation based on the at least one algebraic input parameter value;
   d) determine, by the pseudo random number generator module, one or more pseudo random numbers based on the solution; and
   e) store, by the pseudo random number generator module, the one or more pseudo random numbers in a randomness library for use as seeds for keys by the security application and as subsequent input parameter values for the pseudo random number generator module.

22. A computer implemented method comprising:
determining data to be encrypted, wherein the data comprises plaintext converted into a first bit stream;
determining an encryption key, wherein the encryption key comprises at least one algebraic input value;
generating a set of pseudo random numbers by:
   using the encryption key as an at least one algebraic input parameter value for a transcendental equation, wherein the transcendental equation comprises a transcendental function capable of generating transcendental number outputs from algebraic number inputs;
   calculating a solution to the transcendental equation based on the at least one algebraic input parameter value; and
   generating a pseudo random value based on the solution;
determining a second bit stream based on the generated set of pseudo random numbers;
performing a stream cipher operation based on the first bit stream and the second bit stream to produce an encrypted bit stream; and
outputting the encrypted bit stream.

23. A computer implemented method comprising:
determining an encrypted bit stream data to be decrypted;
determining a decryption key for decrypting the encrypted bit stream, wherein the decryption key comprises at least one algebraic input value used to generate a bit stream for decrypting the encrypted bit stream data;
generating a set of pseudo random numbers by:
   determining at least one algebraic input parameter value for a transcendental equation, wherein the transcendental equation comprises a transcendental function capable of generating transcendental number outputs from algebraic number inputs, and wherein the at least one algebraic input parameter value comprises the decryption key;
   calculating a solution to the transcendental equation based on the at least one algebraic input parameter value; and
   generating a pseudo random number value based on the solution;
determining a second bit stream based on the generated set of pseudo random numbers;
performing a stream cipher operation based on the encrypted bit stream and the second bit stream to produce a first bit stream; and
outputting the first bit stream as the decrypted bit stream.

24. A non-transitory machine-readable medium storing instructions which, when executed by one or more processors, cause an electronic apparatus to perform operations including:
determining data to be encrypted, wherein the data comprises plaintext converted into a first bit stream;
determining an encryption key, wherein the encryption key comprises at least one algebraic input value;
generating a set of pseudo random numbers by:
   using the encryption key as an at least one algebraic input parameter value for a transcendental equation, wherein the transcendental equation comprises a transcendental function capable of generating transcendental number outputs from algebraic number inputs;
   calculating a solution to the transcendental equation based on the at least one algebraic input parameter value; and
   generating a pseudo random value based on the solution;
determining a second bit stream based on the generated set of pseudo random numbers;
performing a stream cipher operation based on the first bit stream and the second bit stream to produce an encrypted bit stream; and
outputting the encrypted bit stream.

25. An encryption/decryption system comprising:
one or more processors; and
memory comprising a non-transitory machine-readable instructions which, when executed by the one or more processors, causes the system to:
   determine data to be encrypted, wherein the data comprises plaintext converted into a first bit stream;
   determine an encryption key, wherein the encryption key comprises at least one algebraic input value;
   generate a set of pseudo random numbers by:
      using the encryption key as an at least one algebraic input parameter value for a transcendental equation, wherein the transcendental equation comprises a transcendental function capable of generating transcendental number outputs from algebraic number inputs;
      calculating a solution to the transcendental equation based on the at least one algebraic input parameter value; and
      generating a pseudo random value based on the solution;
   determine a second bit stream based on the generated set of pseudo random numbers;
   perform a stream cipher operation based on the first bit stream and the second bit stream to produce an encrypted bit stream; and
   output the encrypted bit stream.

26. A non-transitory machine-readable medium storing instructions which, when executed by one or more processors, cause an electronic apparatus to perform operations including:
- determining an encrypted bit stream data to be decrypted;
- determining a decryption key for decrypting the encrypted bit stream, wherein the decryption key comprises at least one algebraic input value used to generate a bit stream for encrypting the encrypted bit stream data;
- generating a set of pseudo random numbers by:
  - determining at least one algebraic input parameter value for a transcendental equation, wherein the transcendental equation comprises a transcendental function capable of generating transcendental number outputs from algebraic number inputs, and wherein the at least one algebraic input parameter value comprises the decryption key;
  - calculating a solution to the transcendental equation based on the at least one algebraic input parameter value; and
  - generating a pseudo random number value based on the solution;
- determining a second bit stream based on the generated set of pseudo random numbers;
- performing a stream cipher operation based on the encrypted bit stream and the second bit stream to produce a first bit stream; and
- outputting the first bit stream as the decrypted bit stream.

27. An encryption/decryption system comprising:
- one or more processors; and
- memory comprising non-transitory machine-readable instructions which, when executed by the one or more processors, causes the system to:
- determine an encrypted bit stream data to be decrypted;
- determine a decryption key for decrypting the encrypted bit stream, wherein the decryption key comprises at least one algebraic input value used to generate a bit stream for encrypting the encrypted bit stream data;
- generate a set of pseudo random numbers by:
  - determining at least one algebraic input parameter value for a transcendental equation, wherein the transcendental equation comprises a transcendental function capable of generating transcendental number outputs from algebraic number inputs, and wherein the at least one algebraic input parameter value comprises the decryption key;
  - calculating a solution to the transcendental equation based on the at least one algebraic input parameter value; and
  - generating a pseudo random number value based on the solution;
- determine a second bit stream based on the generated set of pseudo random numbers;
- perform a stream cipher operation based on the encrypted bit stream and the second bit stream to produce a first bit stream; and
- output the first bit stream as the decrypted bit stream.

* * * * *